United States Patent
Li et al.

(10) Patent No.: US 11,412,434 B2
(45) Date of Patent: Aug. 9, 2022

(54) CELL SELECTION METHOD AND TERMINAL

(71) Applicant: Huawei Technologies Co., Ltd., Shenzhen (CN)

(72) Inventors: Zhongjin Li, Xi'an (CN); Wenjie Duan, Xi'an (CN); Shuiping Long, Beijing (CN); Qiang Yi, Beijing (CN); Guochao Xiong, Xi'an (CN); Liang Hua, Shanghai (CN); Fudong Pang, Shanghai (CN); Sicong Yang, Shanghai (CN)

(73) Assignee: HUAWEI TECHNOLGOIES CO., LTD., Shenzhen (CN)

( * ) Notice: Subject to any disclaimer, the term of this patent is extended or adjusted under 35 U.S.C. 154(b) by 0 days.

(21) Appl. No.: 16/755,695

(22) PCT Filed: Nov. 24, 2017

(86) PCT No.: PCT/CN2017/112888
§ 371 (c)(1),
(2) Date: Apr. 13, 2020

(87) PCT Pub. No.: WO2019/071748
PCT Pub. Date: Apr. 18, 2019

(65) Prior Publication Data
US 2020/0374777 A1 Nov. 26, 2020

(30) Foreign Application Priority Data
Oct. 13, 2017 (WO) ................ PCT/CN2017/106172

(51) Int. Cl.
*H04W 4/00* (2018.01)
*H04W 36/30* (2009.01)
(Continued)

(52) U.S. Cl.
CPC ..... *H04W 36/305* (2018.08); *H04W 36/0079* (2018.08); *H04W 36/14* (2013.01);
(Continued)

(58) Field of Classification Search
CPC ..... H04W 36/08; H04W 36/14; H04W 84/12; H04W 36/0022; H04W 24/10;
(Continued)

(56) References Cited

U.S. PATENT DOCUMENTS 9,173,084 B1 * 10/2015 Foskett ............. H04W 36/0022
2011/0077011 A1 * 3/2011 Wang ................... H04W 68/12
455/445
(Continued)

FOREIGN PATENT DOCUMENTS

| CN | 103229546 A | 7/2013 |
| CN | 103281757 A | 9/2013 |

(Continued)

OTHER PUBLICATIONS

Gost 7.83-2001, "International Standard—The system of standards for information, library and publishing—Electronic Editions—Basic views and output," Jul. 1, 2002, 35 pages.
(Continued)

*Primary Examiner* — Atique Ahmed
(74) *Attorney, Agent, or Firm* — Conley Rose, P.C.

(57) ABSTRACT

A cell selection method includes: when a terminal camps on a first network that does not support a voice service, and voice service needs to be initiated or received, falling back, by the terminal in a circuit switched fallback (CSFB) manner, to a second network that supports the voice service when the terminal fails to establish the voice service with the second network, saving, by the terminal, a location identifier of the first network and a location identifier of the second network to a blacklist. The blacklist is used by the terminal
(Continued)

to choose to camp on a cell of the second network when performing CSFB subsequently.

20 Claims, 7 Drawing Sheets

(51) Int. Cl.
| | |
|---|---|
| *H04W 76/34* | (2018.01) |
| *H04W 76/18* | (2018.01) |
| *H04W 36/00* | (2009.01) |
| *H04W 36/14* | (2009.01) |
| *H04W 36/32* | (2009.01) |
| *H04W 48/18* | (2009.01) |

(52) U.S. Cl.
CPC ........... *H04W 36/32* (2013.01); *H04W 48/18* (2013.01); *H04W 76/18* (2018.02); *H04W 76/34* (2018.02)

(58) Field of Classification Search
CPC ............... H04W 36/305; H04W 76/18; H04W 36/0079; H04W 76/34; H04W 36/32; H04W 48/18
See application file for complete search history.

(56) References Cited

U.S. PATENT DOCUMENTS

| | | | | |
|---|---|---|---|---|
| 2011/0305192 | A1* | 12/2011 | Faccin | H04W 48/18 370/328 |
| 2012/0170503 | A1* | 7/2012 | Kelley | H04W 48/06 370/312 |
| 2012/0329452 | A1 | 12/2012 | Tokuda | |
| 2013/0034060 | A1* | 2/2013 | Lu | H04W 4/90 370/328 |
| 2013/0259006 | A1 | 10/2013 | Khan et al. | |
| 2013/0308527 | A1 | 11/2013 | Chin et al. | |
| 2013/0329567 | A1* | 12/2013 | Mathias | H04W 36/305 370/242 |
| 2013/0329638 | A1* | 12/2013 | Ren | H04W 60/005 370/328 |
| 2015/0358862 | A1 | 12/2015 | Devarayanigari et al. | |
| 2016/0014642 | A1* | 1/2016 | Liang | H04W 36/0022 370/331 |
| 2016/0057682 | A1 | 2/2016 | Yang et al. | |
| 2016/0073314 | A1* | 3/2016 | Yang | H04W 36/0055 370/331 |
| 2016/0192251 | A1* | 6/2016 | Chebolu | H04W 48/16 455/404.1 |
| 2016/0277991 | A1 | 9/2016 | Yang et al. | |
| 2016/0360457 | A1 | 12/2016 | Yang et al. | |
| 2017/0064584 | A1 | 3/2017 | Shan et al. | |
| 2017/0150434 | A1* | 5/2017 | Huang | H04W 48/18 |
| 2018/0227810 | A1 | 8/2018 | Wang | |

FOREIGN PATENT DOCUMENTS

| | | |
|---|---|---|
| CN | 105578544 A | 5/2016 |
| CN | 105792155 A | 7/2016 |
| CN | 105828392 A | 8/2016 |
| CN | 105898812 A | 8/2016 |
| CN | 106255157 A | 12/2016 |
| CN | 106851752 A | 6/2017 |
| CN | 106878975 A | 6/2017 |
| CN | 106879033 A | 6/2017 |
| CN | 106937343 A | 7/2017 |
| EP | 3091784 A1 | 11/2016 |
| EP | 2925081 B1 | 9/2017 |
| EP | 3358883 A1 | 8/2018 |
| JP | 20139077 A | 1/2013 |
| RU | 2605606 C2 | 12/2016 |
| WO | 2013139242 A1 | 9/2013 |

OTHER PUBLICATIONS

S2-124719, Ericsson et al., "Suitable cell selected after CSFB," SA WG2 Meeting #94 ,New Orleans, USA—Nov. 12-16, 2012, 6 pages.

Fengran, W., et al., "Optimization Methods for CSFB Failures in FDD-LTE Network Optimization," Shandong Communication Technology vol. 37 No. 2, Jun. 2017, 7 pages.

* cited by examiner

CELL SELECTION METHOD AND TERMINAL

CROSS-REFERENCE TO RELATED APPLICATIONS

This application is a U.S. National Stage of International Patent Application No. PCT/CN2017/112888 filed on Nov. 24, 2017, which claims priority to International Patent Application No. PCT/CN2017/106172 filed on Oct. 13, 2017. Both of the aforementioned applications are hereby incorporated by reference in their entireties.

TECHNICAL FIELD

This application relates to the field of wireless technologies, and in particular, to a cell selection method and terminal.

BACKGROUND

A long term evolution (Long Term Evolution, LTE) network uses an internet protocol (Internet Protocol, IP) structure, has no circuit switched (Circuit Switched, CS) domain, and does not have sufficient support for a voice service. Therefore, a circuit switched fallback (Circuit Switched Fallback, CSFB) solution emerges.

The CSFB is a single-standby working manner. After being powered on, a terminal preferably camps on the LTE network, and when there is a voice service, the terminal falls back to a 2G/3G circuit domain by using a CSFB technology to execute the voice service. After the voice service ends, the terminal quickly returns to the LTE network by using a fast return (Fast Return, FR) technology, and does not need to fall back for a data service. When a first core network entity accessed by the terminal after the terminal falls back to the 2G/3G circuit domain by using the CSFB technology is different from a second core network entity that receives the voice service of the terminal, if call information transmission between the two core network entities is abnormal, the terminal cannot successfully set up a voice call in the 2G/3G circuit domain, affecting user experience.

In addition, a possible voice solution in a 5G network is as follows: When the terminal needs to initiate a voice service, the terminal first falls back to the LTE network, and then falls back from the LTE network to the 2G/3G circuit domain by using the CSFB technology to execute the voice service. Therefore, a problem that the voice service cannot be successfully set up may also occur in the 5G network.

Further, because current deployment of a communications network is not complete, and a core network entity having a 2G/3G circuit domain is not upgraded to an entity that supports CSFB, a voice call cannot be successfully set up in the 2G/3G circuit domain.

For the foregoing reasons, a probability that a CSFB voice call fails is very large, and this is a problem to be urgently resolved in a network.

SUMMARY

Embodiments of this application provide a cell selection method and terminal, to reduce a failure probability of an existing CSFB voice call.

According to a first aspect, a cell selection method is provided, including: when a terminal camps on a first network that does not support a voice service, if the voice service needs to be initiated or received, falling back, by the terminal in a CSFB manner, to a second network that supports the voice service; and when the terminal fails to establish the voice service with the second network, saving, by the terminal, a location identifier of the first network and a location identifier of the second network to a blacklist as one record, where the blacklist includes at least one record, and the blacklist is used by the terminal to choose to camp on a cell of the second network when performing CSFB again. According to the foregoing method, because the blacklist records information about a cell that the terminal is forbidden to access, when performing CSFB again, the terminal selects the cell of the second network by using the blacklist, so that a voice call success rate of the terminal can be improved, and user experience can be improved.

In a possible design, when the terminal initiates or receives the voice service again, the terminal falls back to the second network based on CSFB; when a location area identity of the cell that is of the second network and that is detected by the terminal is different from a location area identity that is of the second network and that is allocated by the first network to the terminal before the terminal falls back to the second network, the terminal obtains a second location identifier of the first network on which the terminal camps before falling back to the second network, and obtains a first location identifier of the detected cell of the second network, where the first location identifier is a location area identity or a combination of a location area identity and a cell identity, and the second location identifier is a tracking area identity; and when the second location identifier and the first location identifier successfully match any record in the blacklist, the terminal does not choose to camp on the detected cell of the second network, or sets the detected cell of the second network as a to-be-camped-on cell with a low priority.

In this design, when the terminal performs CSFB again for a voice call, if a cross-location area case occurs on the terminal, and the second location identifier of the first network on which the terminal camps before falling back to the second network and the first location identifier of the detected network successfully match a record in the blacklist, the terminal does not camp on the detected cell of the second network, thereby preventing a failure of establishment of the voice service between the terminal and the second network, and reducing a call failure rate of the terminal.

In a possible design, when the terminal initiates or receives the voice service again, the terminal falls back to the second network based on CSFB; when a location area identity of the cell that is of the second network and that is detected by the terminal is different from a location area identity that is of the second network and that is allocated by the first network to the terminal before the terminal falls back to the second network, the terminal obtains a second location identifier of the first network on which the terminal camps before falling back to the second network, and obtains a first location identifier of the detected cell of the second network, where the first location identifier is a location area identity or a combination of a location area identity and a cell identity, and the second location identifier is a tracking area identity; and when the blacklist includes no record that successfully matches the second location identifier and the first location identifier, the terminal chooses to camp on the detected cell of the second network.

In this design, because the blacklist does not include a record corresponding to the second location identifier and the first location identifier, the terminal chooses to camp on the detected cell of the second network, so that a call success rate of the terminal can be improved.

In a possible design, any record in the blacklist further includes a quantity of voice service establishment failure times; and when the terminal fails to establish the voice service with the second network, the method further includes: increasing, by the terminal, the quantity of voice service establishment failure times in the stored record by 1.

In a possible design, when the terminal initiates or receives the voice service again, the terminal falls back to the second network based on CSFB; when a location area identity of the cell that is of the second network and that is detected by the terminal is different from a location area identity that is of the second network and that is allocated by the first network to the terminal before the terminal falls back to the second network, the terminal obtains a second location identifier of the first network on which the terminal camps before falling back to the second network, and obtains a first location identifier of the detected cell of the second network, where the first location identifier is a location area identity or a combination of a location area identity and a cell identity, and the second location identifier is a tracking area identity and when the second location identifier and the first location identifier successfully match any record in the blacklist, and a quantity of voice service establishment failure times in the record is greater than a preset value, the terminal does not choose to camp on the detected cell of the second network, or sets the detected cell of the second network as a to-be-camped-on cell with a low priority.

In this design, when the terminal performs CSFB to select a to-be-camped-on cell, a restriction on the quantity of voice service establishment failure times is added, thereby further improving a success rate of a voice call, and ensuring that the terminal does not camp on the detected cell of the second network when the quantity of voice service establishment failure times is relatively large.

In a possible design, when the terminal initiates or receives the voice service again, the terminal falls back to the second network based on CSFB; and when a location area identity of the cell that is of the second network and that is detected by the terminal is the same as a location area identity that is of the second network and that is allocated by the first network to the terminal before the terminal falls back to the second network, the terminal chooses to camp on the detected cell of the second network.

In this design, when the terminal performs CSFB again for a voice call, if a cross-location area case does not occur on the terminal, the terminal directly camps on the detected cell of the second network, to ensure that the voice call of the terminal can be successfully set up.

in a possible design, after the terminal chooses to camp on the detected cell of the second network, the terminal obtains the second location identifier of the first network on which the terminal camps before falling back to the second network, and obtains the first location identifier of the detected cell of the second network, where the first location identifier is a location area identity or a combination of a location area identity and a cell identity, and the second location identifier is a tracking area identity; and when the second location identifier and the first location identifier successfully match any record in the blacklist, the terminal deletes the successfully matched record from the blacklist.

In this design, when the terminal performs CSFB again for a voice call, if a cross-location area case does not occur on the terminal, after camping on the detected cell of the second network, the terminal checks the blacklist to update the blacklist in real time.

In a possible design, the method further includes: deleting, by the terminal, a record in the blacklist; and the deleting, by the terminal, a record in the blacklist includes: when the terminal initiates or receives the voice service again, falling back, by the terminal, to the second network based on CSFB; when the terminal successfully establishes the voice service with the second network, obtaining, by the terminal, a second location identifier of the first network on which the terminal camps before falling back to the second network, and obtaining a first location identifier of the detected cell of the second network; and when the second location identifier and the first location identifier successfully match any record in the blacklist, deleting, by the terminal, the successfully matched record from the blacklist, where the first location identifier is a location area identity or a combination of a location area identity and a cell identity, and the second location identifier is a tracking area identity; or after the terminal is powered off, deleting, by the terminal, all records in the blacklist; or setting, by the terminal, valid time for any record in the blacklist, and when the valid time expires, deleting, by the terminal, the record.

In this design, the terminal can check the blacklist and delete the record, to ensure validity of the blacklist.

In a possible design, that the second location identifier and the first location identifier successfully match any record in the blacklist includes: if the second location identifier is the same as a location identifier of the first network in any record in the blacklist, and the first location identifier is the same as a location identifier of the second network in the record, determining that matching succeeds.

In a possible design, the terminal receives first information from a server or reports first information to a server, where the first information includes at least one record; and the terminal saves the first information to the blacklist, where one record includes the location identifier of the first network and the location identifier of the second network.

In a possible design, the location identifier of the first network is a tracking area identity of the first network, and the location identifier of the second network is a location area identity of the second network or a combination of a location area identity of the second network and a cell identity corresponding to the location area identity of the second network.

In this design, the terminal can obtain, from an external server, first information that carries information about a cell that the terminal is forbidden to access, save the first information to the blacklist, and select the cell of the second network by using the blacklist when the terminal performs CSFB again, thereby reducing a voice call failure rate of the terminal.

According to a second aspect, an embodiment of this application provides a cell selection terminal, including a communications unit and a processing unit. The communications unit is configured to: when the terminal camps on a first network that does not support a voice service, if the voice service needs to be initiated or received, fall back, in a circuit switched fallback CSFB manner, to a second network that supports the voice service. The processing unit is configured to: when the terminal fails to establish the voice service with the second network, save a location identifier of the first network and a location identifier of the second network to a blacklist as one record, where the blacklist includes at least one record, and the blacklist is used by the communications unit to choose to camp on a cell of the second network when performing CSFB again.

In a possible design, the communications unit is further configured to:

when the terminal initiates or receives the voice service again, fall back to the second network based on CSFB; when a location area identity of the detected cell of the second network is different from a location area identity that is of the second network and that is allocated by the first network to the terminal before the terminal falls back to the second network, obtain a second location identifier of the first network on which the terminal camps before falling back to the second network, and obtain a first location identifier of the detected cell of the second network, where the first location identifier is a location area identity or a combination of a location area identity and a cell identity, and the second location identifier is a tracking area identity; and when the second location identifier and the first location identifier successfully match any record in the blacklist, skip choosing to camp on the detected cell of the second network, or set the detected cell of the second network as a to-be-camped-on cell with a low priority.

In a possible design, the communications unit is further configured to:

when the terminal initiates or receives the voice service again, fall back to the second network based on CSFB; when a location area identity of the detected cell of the second network is different from a location area identity that is of the second network and that is allocated by the first network to the terminal before the terminal falls back to the second network, obtain a second location identifier of the first network on which the terminal camps before falling back to the second network, and obtain a first location identifier of the detected cell of the second network, where the first location identifier is a location area identity or a combination of a location area identity and a cell identity, and the second location identifier is a tracking area identity; and when the blacklist includes no record that successfully matches the second location identifier and the first location identifier, choose to camp on the detected cell of the second network.

In a possible design, any record in the blacklist further includes a quantity of voice service establishment failure times and when the terminal fails to establish the voice service with the second network, the processing unit is further configured to increase the quantity of voice service establishment failure times in the stored record by 1.

In a possible design, the communications unit is further configured to:

when the terminal initiates or receives the voice service again, fall back to the second network based on CSFB; when a location area identity of the detected cell of the second network is different from a location area identity that is of the second network and that is allocated by the first network to the terminal before the terminal falls back to the second network, obtain a second location identifier of the first network on which the terminal camps before falling back to the second network, and obtain a first location identifier of the detected cell of the second network, where the first location identifier is a location area identity or a combination of a location area identity and a cell identity, and the second location identifier is a tracking area identity; and when the second location identifier and the first location identifier successfully match any record in the blacklist, and a quantity of voice service establishment failure times in the record is greater than a preset value, skip choosing to camp on the detected cell of the second network, or set the detected cell of the second network as a to-be-camped-on cell with a low priority.

In a possible design, the communications unit is further configured to:

when the terminal initiates or receives the voice service again, fall back to the second network based on CSFB, and when a location area identity of the detected cell of the second network is the same as a location area identity that is of the second network and that is allocated by the first network to the terminal before the terminal falls back to the second network, choose to camp on the detected cell of the second network.

In a possible design, after choosing to camp on the detected cell of the second network, the communications unit is further configured to:

obtain the second location identifier of the first network on which the terminal camps before falling back to the second network, and obtain the first location identifier of the detected cell of the second network, where the first location identifier is a location area identity or a combination of a location area identity and a cell identity, and the second location identity is a tracking area identity; and when the second location identifier and the first location identifier successfully match any record in the blacklist, delete, by the terminal, the successfully matched record from the blacklist.

In a possible design, the processing unit is further configured to:

delete a record in the blacklist; and the deleting a record in the blacklist includes:

when the terminal initiates or receives the voice service again, falling back to the second network based on CSFB; when the terminal successfully establishes the voice service with the second network, obtaining, by the communications unit, a second location identifier of the first network on which the terminal camps before falling back to the second network, and obtaining a first location identifier of the detected cell of the second network; and when the second location identifier and the first location identifier successfully match any record in the blacklist, deleting, by the processing unit, the successfully matched record from the blacklist, where the first location identifier is a location area identity or a combination of a location area identity and a cell identity, and the second location identifier is a tracking area identity; or after the terminal is powered off, deleting, by the processing unit, all records in the blacklist; or setting, by the processing unit, valid time for any record in the blacklist, and when the valid time expires, deleting, by the processing unit, the record.

In a possible design, that the second location identifier and the first location identifier successfully match any record in the blacklist includes:

if the second location identifier is the same as a location identifier of the first network in any record in the blacklist, and the first location identifier is the same as a location identifier of the second network in the record, determining that matching succeeds.

In a possible design, the communications unit is further configured to:

receive first information from a server, where the first information includes at least one record; and the processing unit is further configured to save the first information to the blacklist, where one record includes the location identifier of the first network and the location identifier of the second network.

In a possible design, the location identifier of the first network is a tracking area identity of the first network, and the location identifier of the second network is a location area identity of the second network or a combination of a location area identity of the second network and a cell identity corresponding to the location area identity of the second network.

According to a third aspect, an embodiment of this application provides a terminal, including a communications component, a processor, and a memory. The communications component, the processor, and the memory may be connected by using a bus system. The memory is configured to store a program, an instruction, or code, and the processor is configured to execute the program, the instruction, or the code in the memory to complete the method in the first aspect or any possible implementation of the first aspect.

According to a fourth aspect, an embodiment of this application provides a computer readable storage medium. The computer readable storage medium stores an instruction, and when the instruction runs on a computer, the computer is enabled to perform the method in the first aspect.

According to a fifth aspect, an embodiment of this application provides a computer program product including an instruction, and when the instruction runs on a computer, the computer is enabled to perform the method in the first aspect.

According to a sixth aspect, an embodiment of this application provides a chip system, and the chip system includes a processor, configured to support a terminal in implementing functions involved in the first aspect. In a possible design, the chip system further includes a memory, and the memory is configured to store a program instruction and data that are necessary to the terminal. The chip system may include a chip, or include a chip and another discrete device.

DESCRIPTION OF EMBODIMENTS

The following clearly and completely describes the technical solutions in the embodiments of this application with reference to the accompanying drawings in the embodiments of this application.

An LTE system is used as an example. After being attached to the LTE network, an LTE single-standby terminal camps on the LTE network and cannot send or receive a CS domain service such as a voice call. To enable the terminal to initiate the CS domain service such as the voice call and receive the voice call when the terminal accesses the LTE network, a CSFB technology is used. To be specific, when the terminal covered by the LTE network processes a voice service, the terminal first falls back to a CS domain network and processes the voice service in the CS domain network, and returns to the LTE network after the service ends.

Figure 1:
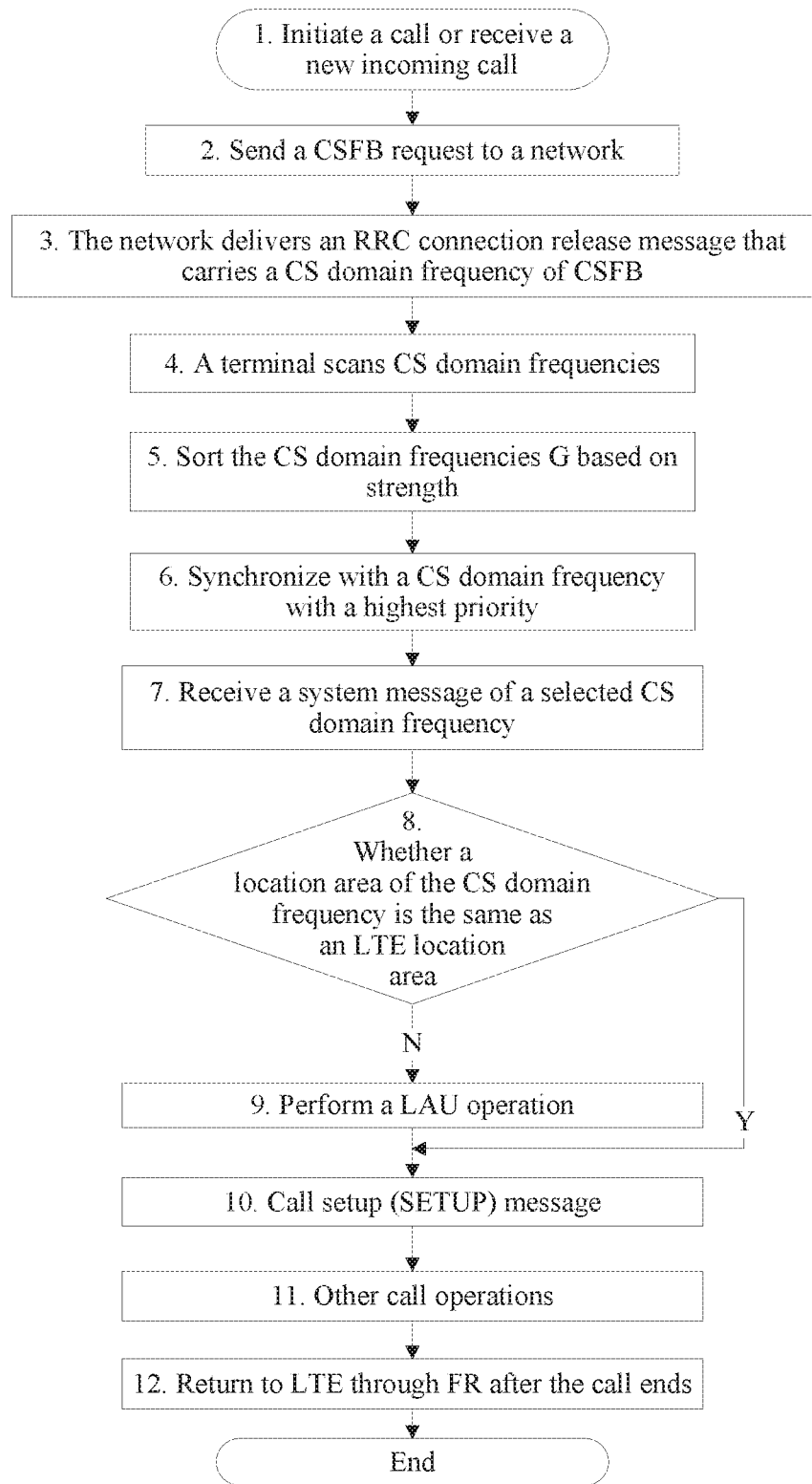
FIG. 1 is a schematic diagram of a CSFB process after a call is initiated or a call is received in an existing LTE network.

FIG. 1 is a schematic diagram of a CSFB process after a call is initiated or a call is received in an existing LTE network. The process specifically includes the following procedures.

(1) A terminal receives a new incoming call or initiates a call in an LTE network.

(2) The terminal sends a CSFB request to the LTE network, to request to fall back to a CS domain to execute a voice service.

(3) The LTE network sends a radio resource control (Radio Resource Control, RRC) connection release (RRC Connection Release) message to the terminal, and adds, to the RRC connection release message, information about a CS domain frequency to which the terminal needs to fall back through CSFB.

(4) The terminal scans CS domain frequencies delivered by the LTE network, and receives receiving strength of the CS domain frequency.

(5) The terminal sorts, based on strength, priorities of the CS domain frequencies delivered by the LTE network, where better strength indicates a higher priority.

(6) The terminal selects a CS domain frequency in a priority sequence, and performs a synchronization operation on the selected CS domain frequency.

(7) If the terminal is successfully synchronized with the selected CS domain frequency, the terminal receives a system message of the selected CS domain frequency.

(8) If a cell of the currently synchronized frequency meets an access condition, the terminal camps on the cell; further, it is determined whether a location area of the selected CS domain frequency is the same as a location area that is in a CS domain and that is allocated by the LTE network to the terminal when the terminal is attached to the LTE network; and if the location areas are the same, step (10) is performed; or if the location areas are different, step (9) is performed.

(9) The terminal performs a location area update (location area update, LAU) operation on the selected CS domain frequency.

(10) The terminal does not perform a location area update operation in the CS domain, directly sets up a voice call at the selected CS domain frequency, and initiates or receives a call setup (SET UP) message.

(11) After the terminal successfully falls back to the selected CS domain frequency, the terminal performs a subsequent operation of the voice call.

(12) The terminal returns to the LTE network through FR after the voice call ends.

It can be learned that a case in which a network works normally is described in the procedure in FIG. 1, and a processing manner performed when an exception occurs in a network operation is not provided. For example, a core network entity mobile switching center (Mobile Switching Center, MSC) server (Server) accessed by the terminal when performing the LAU operation in step (10) is not a same core network entity as a core network entity MSC server that receives an incoming call from a user, and when call information transfer between the two core network entities is abnormal, a voice call fails to be set up in the CS domain. Alternatively, for example, when the core network entity accessed by the terminal when performing the LAU operation in step (10) does not support a CSFB function, a voice call may also fail to be set up in the CS domain.

In view of the foregoing problem, embodiments of this application provide a cell selection method and terminal, to reduce a failure probability of an existing CSFB voice call. The method and an apparatus are based on a same inventive concept. Because a problem-resolving principle of the method is similar to that of the apparatus, for similar details, mutually refer to implementation of the apparatus and that of the method. No repeated description is provided.

The embodiments of this application are applied to a scenario in which a terminal falls back to a CS domain through CSFB to perform a voice service and select a CS domain cell. When the terminal fails to establish a voice service with a CS domain network to which the terminal falls back through CSFB, a location identifier of a first network before the fallback and a location identifier of a second network in which a communication connection is released after CSFB and camping are saved to a blacklist as one record. When the terminal initiates or receives the voice service again, the terminal selects a cell of the second network by using the blacklist when performing CSFB. In this way, the terminal can be prevented from camping, again, on a cell in a CS domain in which the terminal fails to establish the voice service, thereby improving a success probability of a CSFB voice call.

Figure 2:
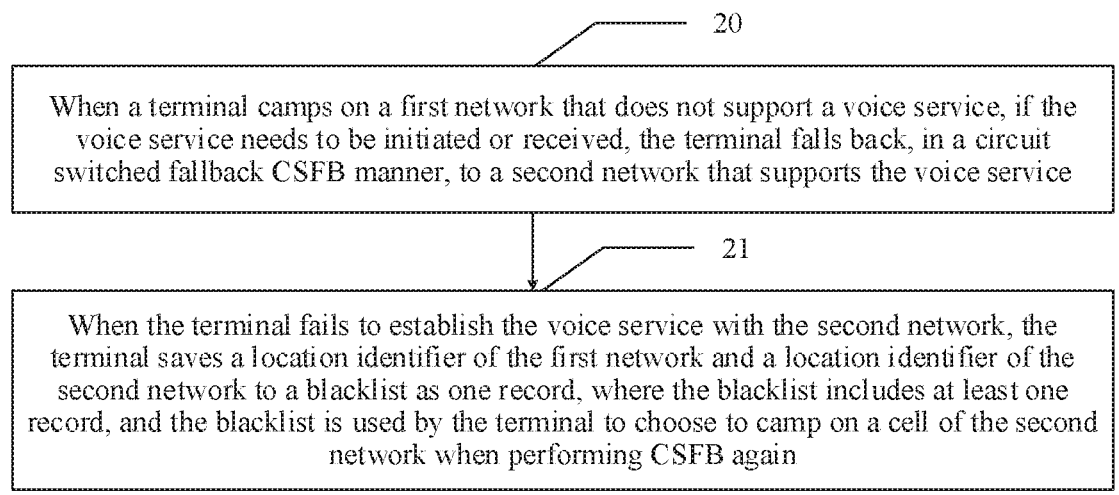
FIG. 2 is a flowchart of a cell selection method according to an embodiment of this application.

FIG. 2 is a flowchart of a cell selection method according to an embodiment of this application. This procedure may be specifically implemented by hardware and software programming, or a combination of software and hardware.

A terminal may be configured to perform the procedure shown in FIG. 2, and the terminal includes but is not limited to a mobile phone, a network access terminal device, an internet of things terminal device, and the like. A function module that is in the terminal and that is configured to execute a cell selection solution provided in this embodiment of this application may be specifically implemented by using hardware and software programming and a combination of software and hardware. The hardware may include one or more signal processing and/or application-specific integrated circuits.

As shown in FIG. 2, the procedure specifically includes the following processing processes.

Step 20: When a terminal camps on a first network that does not support a voice service, if the voice service needs to be initiated or received, the terminal falls back, in a circuit switched fallback CSFB manner, to a second network that supports the voice service.

Optionally, the first network is an LTE network or a 5G network, and the second network is a second-generation mobile communications technology (the second generation, 2G) network or a third-generation mobile communications technology (the third generation, 3G) network.

Step 21: When the terminal fails to establish the voice service with the second network, the terminal saves a location identifier of the first network and a location identifier of the second network to a blacklist as one record, where the blacklist includes at least one record, and the blacklist is used by the terminal to choose to camp on a cell of the second network when performing CSFB again.

It should be noted that in actual application, when the terminal fails to establish the voice service with the second network, the terminal can detect that a communication connection between the terminal and the second network is released, and this indicates that the terminal fails to establish the voice service with the second network.

Optionally, the blacklist is stored at an access stratum (Access Stratum, AS) of the terminal, and a record stored in the blacklist is a cell that restricts access of the terminal.

Generally, in consideration of system performance of the terminal and an active area of a user, a quantity of records stored in the blacklist is not greater than 32, and the records are maintained according to a first-in-first-out rule.

The location identifier of the first network is a tracking area identity (Tracking Area Identity, TAI) of the first network or a location area identity (location area identity, LAI) allocated by the first network to UE. The location identifier of the second network is a location area identity (Location Area Identity, LAI) of the second network or a combination of a location area identity of the second network and a cell identity corresponding to the location area identity of the second network. It should be noted that, the combination of the location area identity and the cell identity in this embodiment of this application may be a cell global identity (Cell Global Identification, CGI), and the cell identity may be any other identity used to identify a cell, such as an absolute radio frequency channel number (Absolute Radio Frequency Channel Number, ARFCN) and a base station identity code (Base Station Identity Code, BSIC).

In a possible design, the blacklist includes a plurality of records, and each record includes the location identifier of the first network and the location identifier of the second network. In this case, when the terminal initiates or receives the voice service again, the terminal selects the cell of the second network when performing CSFB, and this may be further implemented by using the following process.

S1. The terminal falls back to the second network based on CSFB, and when a location area identity of the cell that is of the second network and that is detected by the terminal is different from a location area identity that is of the second network and that is allocated by the first network to the terminal before the terminal falls back to the second network, the terminal obtains a second location identifier of the first network on which the terminal camps before falling back to the second network, and obtains a first location identifier of the detected cell of the second network, where the first location identifier is a location area identity or a combination of a location area identity and a cell identity (Cell ID), or the first location identifier is a combination of a location area identity and another identity used to identify the cell of the second network, where the another identity used to identify the cell of the second network may be a combination of an ARFCN and a BSIC, and the second location identifier is a tracking area identity or a location area identity that is allocated by the first network to the UE.

It should be noted that in actual application, the terminal may read system information to obtain the first location identifier of the cell of the second network; or the terminal may have already obtained system information from a network side and cached the system information on the terminal locally, and the terminal locally obtains the first location identifier of the cell of the second network.

S2: When the second location identifier and the first location identifier successfully match any record in the blacklist, the terminal does not choose to camp on the detected cell of the second network, or sets the detected cell of the second network as a to-be-camped-on cell with a low priority. Alternatively, when the first location identifier of the second network matches a location identifier of the second network in the blacklist, the terminal does not choose to camp on the detected cell of the second network, or sets the detected cell of the second network as a to-be-camped-on cell with a low priority.

S3: When the blacklist includes no record that successfully matches the second location identifier and the first location identifier, the terminal chooses to camp on the detected cell of the second network. Alternatively, corresponding to S2, when the blacklist includes no record in which a location identifier of the second network matches the first location identifier of the second network, the terminal chooses to camp on the detected cell of the second network.

It should be noted that, matching the second location identifier and the first location identifier with any record in the blacklist includes: comparing the second location identifier with a location identifier of the first network in any record in the blacklist, and comparing the first location identifier with a location identifier of the second network in the record; and if the second location identifier is the same as the location identifier of the first network and the first location identifier is the same as the location identifier of the second network, determining that the matching succeeds; or if the second location identifier is different from the location identifier of the first network, or the first location identifier is different from the location identifier of the second network, determining that the matching fails.

Further, in step S1, if the terminal falls back to the second network based on CSFB, when the location area identity of the cell that is of the second network and that is detected by the terminal is the same as the location area identity that is of the second network and that is allocated by the first network to the terminal before the terminal falls back to the second network, the terminal chooses to camp on the detected cell of the second network. Alternatively, when the location area identity of the cell that is of the second network and that is detected by the terminal is the same as the location area identity that is of the second network and that is allocated by the first network to the terminal before the terminal falls hack to the second network, the terminal further checks whether the second location identifier and the first location identifier match any record in the blacklist, and if the second location identifier and the first location identifier match any record in the blacklist, the terminal does not choose to camp on the detected cell of the second network, or sets the detected cell of the second network as a to-be-camped-on cell with a low priority.

In another possible design, any record in the blacklist further includes a quantity of voice service establishment failure times, where the quantity of voice service establishment failure times indicates a quantity of voice service establishment failure times in an area that is of the location identifier of the first network and the location identifier of the second network and that corresponds to the record, and an initial value of the quantity of voice service establishment failure times may be set to 0. When the terminal fails to establish the voice service with the second network, the terminal increases the quantity of voice service establishment failure times in the stored record by 1. In this case, the blacklist includes a plurality of records, and each record includes the location identifier of the first network, the location identifier of the second network, and the quantity of voice service establishment failure times. In this case, when the terminal initiates or receives the voice service again, selecting the cell of the second network when performing CSFB may be implemented by using the following process.

P1: The terminal falls back to the second network based on CSFB, and when a location area identity of the cell that is of the second network and that is detected by the terminal is different from a location area identity that is of the second network and that is allocated by the first network to the terminal before the terminal falls hack to the second network, the terminal obtains a second location identifier of the first network on which the terminal camps before falling hack to the second network, and obtains a first location identifier of the detected cell of the second network, where the first location identifier is a location area identity or a combination of a location area identity and a cell identity (Cell ID), or the first location identifier is a combination of a location area identity and another identity used to identify the cell of the second network, where the another identity used to identify the cell of the second network may be a combination of an ARFCN and a BSIC, and the second location identifier is a tracking area identity or a location area identity that is allocated by the first network to the UE.

It should be noted that in actual application, the terminal may read system information to obtain the first location identifier of the cell of the second network; or the terminal may have already obtained system information from a network side and cached the system information on the terminal locally, and the terminal locally obtains the first location identifier of the cell of the second network.

P2: When the second location identifier and the first location identifier successfully match any record in the blacklist, and a quantity of voice service establishment failure times in the record is greater than a preset value, the terminal does not choose to camp on the detected cell of the second network, or sets the detected cell of the second network as a to-be-camped-on cell with a low priority. Alternatively, when the first location identifier of the second network matches a location identifier of the second network in the blacklist, and a quantity of voice service establishment failure times in the record is greater than a preset value, the terminal does not choose to camp on the detected cell of the second network, or sets the detected cell of the second network as a to-be-camped-on cell with a low priority.

The quantity of voice service establishment failure times may be set to 3. The terminal does not choose to camp on the detected cell of the second network or sets the detected cell of the second network as a to-be-camped-on cell with a low priority only when the quantity of voice service establishment failure times is greater than 3.

P3: When the blacklist includes no record that successfully matches the second location identifier and the first location identifier, the terminal chooses to camp on the detected cell of the second network: Alternatively, corresponding to P2, when the blacklist includes no record in which a location identifier of the second network matches the first location identifier of the second network, the terminal chooses to camp on the detected cell of the second network.

Further, in step S1, if the terminal falls back to the second network based on CSFB, when the location area identity of the cell that is of the second network and that is detected by the terminal is the same as the location area identity that is of the second network and that is allocated by the first network to the terminal before the terminal falls back to the second network, the terminal chooses to camp on the detected cell of the second network. Alternatively, when the location area identity of the cell that is of the second network and that is detected by the terminal is the same as the location area identity that is of the second network and that is allocated by the first network to the terminal before the terminal falls hack to the second network, the terminal further checks whether the second location identifier and the first location identifier match any record in the blacklist, and if the second location identifier and the first location identifier match any record in the blacklist, and a quantity of voice service establishment failure times in the record is greater than a preset value, the terminal does not choose to camp on the detected cell of the second network, or sets the detected cell of the second network as a to-be-camped-on cell with a low priority. The quantity of voice service establishment failure times may be set to 3. The terminal does not choose to camp on the detected cell of the second network or sets the detected cell of the second network as a to-be-camped-on cell with a low priority only when the quantity of voice service establishment failure times is greater than 3.

It should be noted that, in the foregoing cases, when the terminal still does not detect, after trying all frequencies, a cell that can be normally camped on, the terminal may retry to camp on a cell with a low priority.

In addition, it should be noted that, in steps S1 to S3 or steps P1 to P3, a specific execution sequence of S1 and S2 or a specific execution sequence of P1 and P2 is not limited in this specification. To be specific, in another optional implementation, the terminal determines whether the second location identifier and the first location identifier can successfully match any record in the blacklist; if the matching succeeds, the terminal further determines whether the location area identity of the detected cell of the second network is the same as the location area identity that is of the second network and that is allocated by the first network to the terminal before the terminal falls back to the second network; and if the location area identity of the detected cell of the second network is different from the location area identity that is of the second network and that is allocated by the first network to the terminal before the terminal falls back to the second network, the terminal does not choose to camp on the detected cell of the second network, or reduces a priority of the detected cell of the second network. In another optional implementation, the terminal checks a quantity of voice service establishment failure times in a record that is in the blacklist and that matches the second location identifier and the first location identifier; and when the quantity of times is greater than a preset value, the terminal does not choose to camp on the detected cell of the second network, or reduces a priority of the detected cell of the second network. During specific implementation, the terminal may alternatively check a quantity of voice service establishment failure times in a record that is in the blacklist and in which a location identifier of the second network matches the first location identifier, and when the quantity of times is greater than a preset value, the terminal does not choose to camp on the detected cell of the second network, or reduces a priority of the detected cell of the second network.

Otherwise, if the location area identity of the detected cell of the second network is the same as the location area identity that is of the second network and that is allocated by the first network to the terminal before the terminal falls back to the second network, or when a quantity of voice service establishment failure times in a record that is in the blacklist and that matches the second location identifier and the first location identifier is greater than a preset value, the terminal does not choose to camp on the detected cell of the second network, or reduces a priority of the detected cell of the second network, and if the quantity of times is less than the preset value, the terminal still chooses to camp on the detected cell of the second network; or if the matching fails, the terminal camps on the detected cell of the second network.

It should be noted that, in the foregoing two possible designs, the terminal falls back to the second network based on CSFB, and when the location area identity of the cell that is of the second network and that is detected by the terminal is the same as the location area identity that is of the second network and that is allocated by the first network to the terminal before the terminal falls back to the second network, after choosing to camp on the detected cell of the second network, the terminal further needs to change a record in the blacklist. A specific implementation process is as follows: The terminal obtains the second location identifier of the first network on which the terminal camps before falling back to the second network, and obtains the first location identifier of the detected cell of the second network; and when the second location identifier and the first location identifier successfully match any record in the blacklist, the terminal deletes the successfully matched record from the blacklist.

Further, the terminal needs to periodically delete a record in the blacklist. Specifically, the following cases are further included:

Case 1: When the terminal initiates or receives the voice service again, the terminal falls back to the second network based on CSFB; when the terminal successfully establishes the voice service with the second network, the terminal obtains a second location identifier of the first network on which the terminal camps before falling back to the second network, and obtains a first location identifier of the detected cell of the second network; and when the second location identifier and the first location identifier successfully match any record in the blacklist, the terminal deletes the successfully matched record from the blacklist.

Case 2: After the terminal is powered off, the terminal deletes all records in the blacklist.

Case 3: The terminal sets valid time for any record in the blacklist, and when the valid time expires, the terminal deletes the record. In actual application, time at which the voice service fails to be established with the second network for the last time may be set in a record, and valid time is set for the record. For example, the valid time may be set to 24 hours, and when the record has been stored for 24 hours, if the record still exists in the blacklist, the terminal deletes the record.

It can be learned from the foregoing process that the blacklist is stored locally on the terminal, and the record in the blacklist is created by the terminal. Certainly, the record in the blacklist may also be created by a server. The server may be a service provider of the terminal, or may be an operator server. For example, a terminal vendor or the operator server may further send blacklist information to a user terminal, and periodically update the blacklist information to the user terminal. The terminal vendor or the operator server may further send blacklist information of a related location area to a user terminal at a specified location, for example, send, based on the location of the terminal, blacklist information related to the location, or a core network entity to which the terminal is attached sends, to the user terminal, blacklist information of a location area managed by the core network entity. Alternatively, when detecting that the voice service fails to be established when the terminal falls back from the first network to the second network through CSFB, the operator server sends first information to the terminal, and the terminal receives the first information from the server, where the first information includes at least one record, and the terminal saves the first information to the blacklist, where a form of any record is consistent with that in the foregoing descriptions, and any record includes at least the location identifier of the first network and the location identifier of the second network. A specific implementation process of the terminal for the blacklist is consistent with the foregoing descriptions.

It should be noted that, a function of selecting a CS domain cell in the foregoing process of optimizing CSFB based on the blacklist may be enabled or disabled, for example, a switch used for enabling or disabling the function is provided for a developer by using an interaction interface.

The cell selection method in FIG. 2 is described in detail below by using an example in which the first network is an LTE network and the second network is a 2G global system for mobile communications (Global System for Mobile Communications, GSM) network or a 3G universal mobile telecommunications system (Universal Mobile Telecommunications System, UMTS) network.

When the terminal receives a new incoming call or initiates a call in the LTE network, and the voice service fails to be established because an exception occurs during CSFB, an AS stratum of the terminal records a TAI of the LTE network before CSFB and a LAI of a CS domain cell released by a network after CSFB and camping, or records a TAI of the LTE network before CSFB and a combination of a cell identity and a LAI of a CS domain cell released by a network after CSFB and camping. The TAI may be obtained from a mobility management control (mobility manage control, MMC) center on the terminal. Recorded information includes: TAI+LAI+Current TICK value, where a TICK value indicates a quantity of voice service establishment failure times. The TAI+LAI+Current TICK value form a complete record in the blacklist. Certainly, information in one record may alternatively include only TAI+LAI. Optionally, the terminal may set a validity period for each record. For example, the validity period of each record is 24 hours, and when a validity period of a record expires, the terminal deletes the record. When the terminal successfully executes the voice service in a cell with a corresponding TAI+LAI, a corresponding record needs to be deleted. In addition, when the terminal is powered off and powered on again, records in the blacklist are cleared. A record may be in a form shown in Table 1.

TABLE 1

Figure 3A:
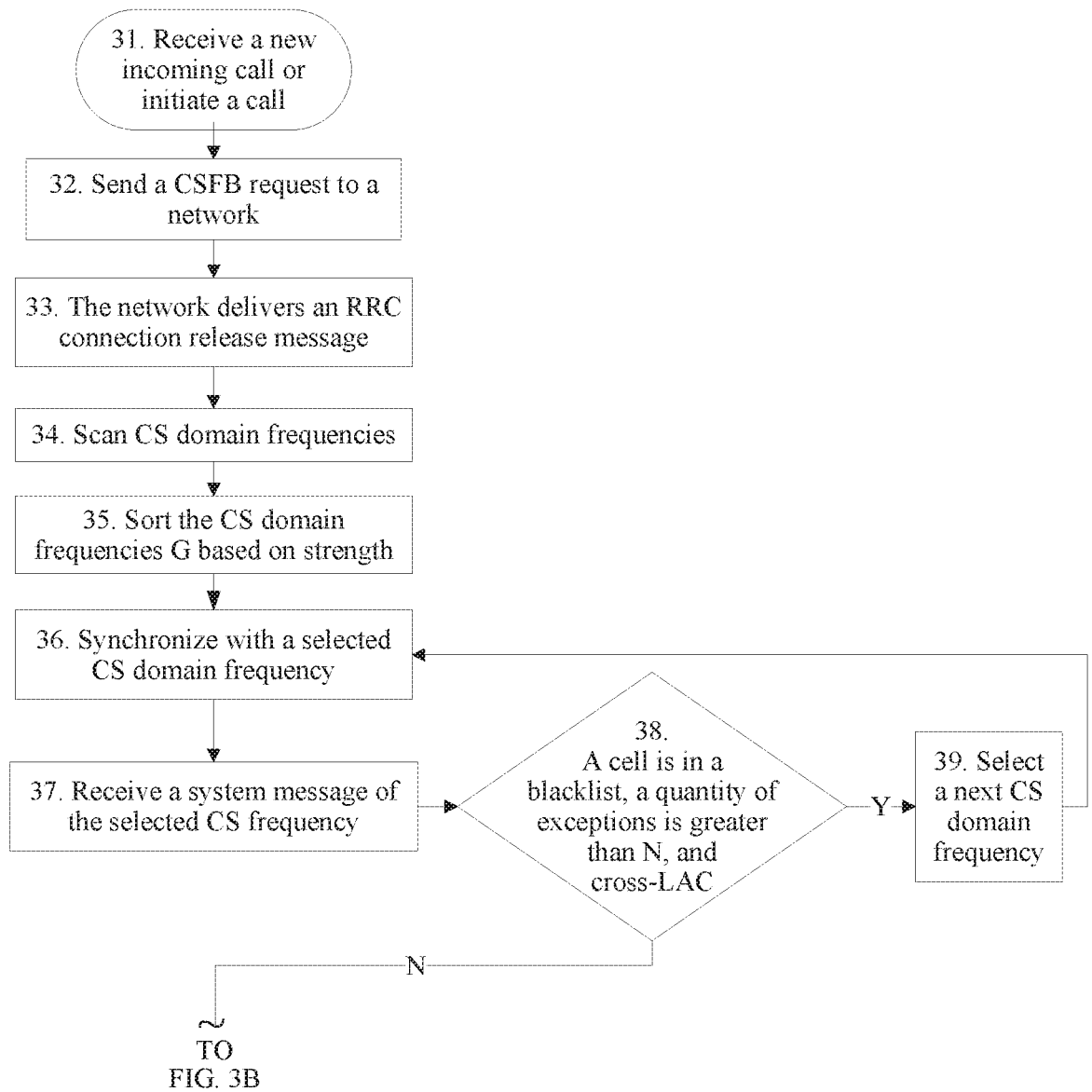
FIG. 3A and FIG. 3B are a schematic diagram of a CSFB process after a call is initiated or a call is received in an LTE network according to an embodiment of this application.
Figure 3B:
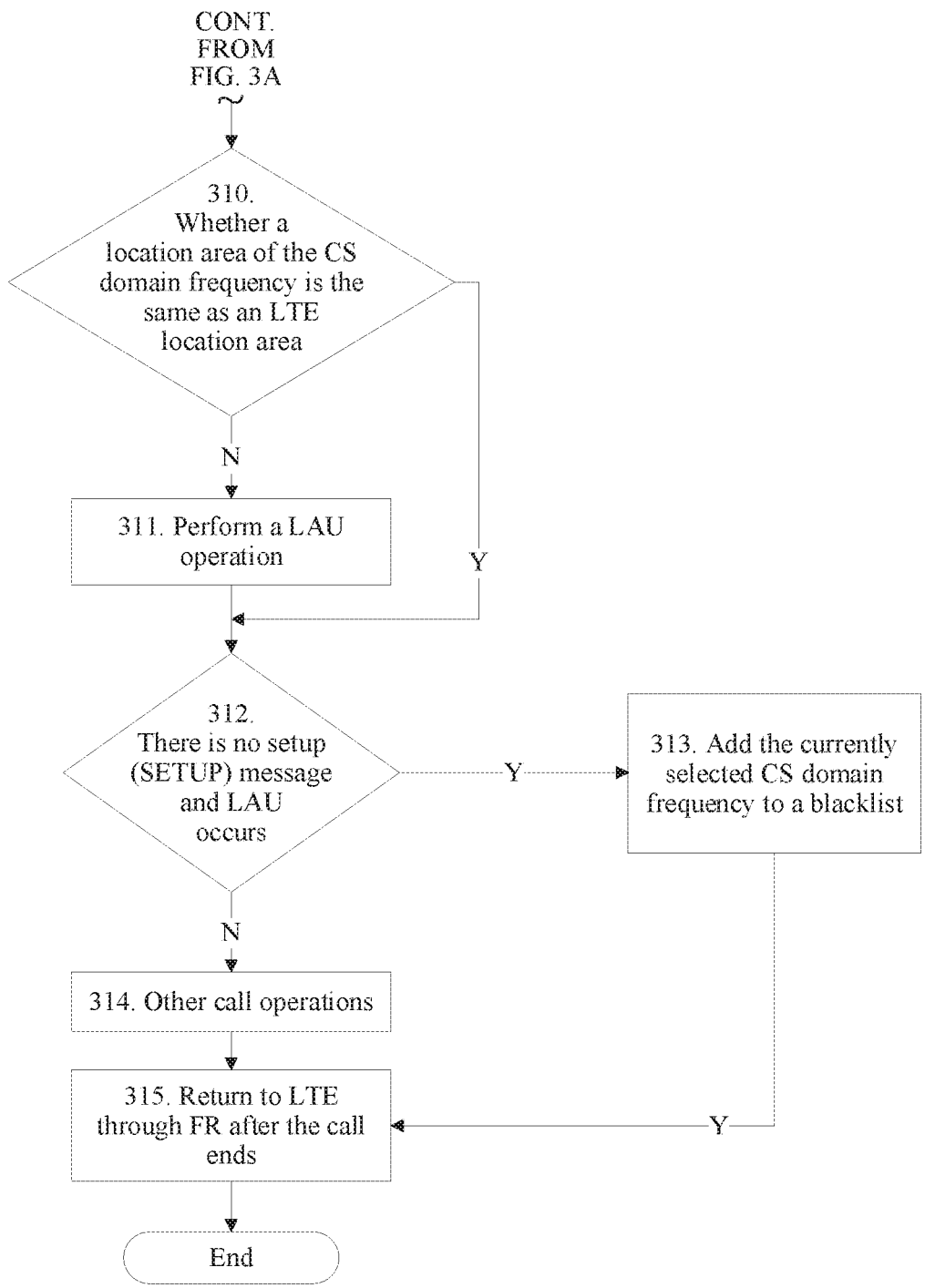

Tracking area information of LTE
Location area identity of GSM/UMTS or combination of a location area identity of GSM/UMTS and a cell identity
Quantity of voice call failure times
Time at which the last voice call fails When the terminal initiates the voice service again, the terminal selects a CS domain cell by using the blacklist. For a specific procedure, refer to FIG. 3A and FIG. 3B.

Step 31: The terminal receives a new incoming call or initiates a call in an LTE network.

Step 32: The terminal sends a CSFB request to the LTE network, to request to fall back to a CS domain to execute a voice service.

Step 33: The LTE network sends an RRC connection release message to the terminal, and adds, to the RRC connection release message, information about a CS domain frequency to which the terminal needs to fall back through CSFB.

Step 34: The terminal scans CS domain frequencies delivered by the LTE network, and receives receiving strength of the CS domain frequency.

Step 35: The terminal sorts, based on strength, priorities of the CS domain frequencies delivered by the LTE network, where better strength indicates a higher priority, and the terminal selects a CS domain frequency in a priority sequence.

Step 36: Perform a synchronization operation on the selected CS domain frequency.

Step 37: If the terminal is successfully synchronized with the selected CS domain frequency, the terminal receives a system message of the selected CS domain frequency.

Step 38: The terminal camps on a cell of the selected CS domain frequency. In this embodiment, the following process is implemented. If a camping condition is met, step 310 is performed. If the camping condition is not met, step 39 is performed.

Specifically, if a LAI 1 of a cell of the currently selected CS domain frequency is different from a LAI 2 allocated by the LTE network to the terminal, the terminal belongs to a cross-location area code (Location Area Code, LAC) scenario, and whether a TAI of the LTE network before the terminal falls back and a LAI of the cell of the selected CS domain frequency match a record in the blacklist is further determined, or whether a TAI of the LTE network before the terminal falls back and a combination of a LAI of the cell of the selected CS domain frequency and a cell identity match a record in the blacklist is further determined.

(a) If the matching succeeds and a corresponding quantity of occurrence times is greater than N, it is determined that the camping condition is not met. In this case, the terminal does not choose to camp on the cell of the CS domain frequency, or sets the cell of the CS domain frequency as a to-be-camped-on cell with a low priority.

It should be noted that a preset value N of the quantity of occurrence times may be flexibly configured by the terminal based on an actual case. To be specific, when the quantity of occurrence times is greater than the preconfigured preset value N, the cell of the CS domain frequency is set as the to-be-camped-on cell with a low priority.

It should be noted that the quantity of occurrence times may be not considered in step a. If the matching succeeds, it is determined that the camping condition is not met.

(b) If there is no record that matches the blacklist, it is determined that the camping condition is met. In this case, the terminal preferably camps on the cell of the CS domain frequency as normal.

Specifically, if a LAI 1 of the cell of the currently selected CS domain frequency is the same as a LAI 2 allocated by the LTE network to the terminal, the terminal does not belong to a cross-LAI scenario and determines that the camping condition is met. In this case, the terminal preferably camps on the cell of the CS domain frequency as normal. The terminal may further check whether a TAI of the LTE network and the LAI 1 of the cell of the currently selected CS domain frequency are in a record in the blacklist, and if yes, delete the record from the blacklist. Alternatively, the terminal may further check whether a TAI of the LTE network and a combination of the LAI 1 of the cell of the currently selected CS domain frequency and a cell ID are in a record in the blacklist, and if yes, delete the record from the blacklist.

Step 39: The terminal continues to select a next CS domain frequency based on a sequence of the priorities of the CS domain frequencies, and returns to step 36.

Step 310: If the cell currently meets an access condition, camp on the cell, and further determine whether a location area of the selected CS domain frequency is the same as a location area to which the terminal is attached in the LTE network; and if the location areas are the same, perform step 312; or if the location areas are different, perform step 311.

Step 311: The terminal performs a LAU operation on the selected CS domain frequency, and further performs step 312.

Step 312: When establishing a voice service at the selected CS domain frequency, the terminal determines whether a voice setup message is successfully sent or received; and if yes, performs step 314; otherwise, performs step 313.

Step 313: Add the TAI of the LTE network before the fallback and the LAI 1 of the cell of the selected CS domain frequency to the blacklist; or add the TAI of the LTE network before the fallback and a combination of the LAI 1 of the cell of the selected CS domain frequency and the cell identity to the blacklist.

Step 314: After successfully falling back to a CS domain, the terminal performs a subsequent operation of a voice call.

Step 315: The terminal returns to the LTE network through FR after the voice call ends.

Figure 4:
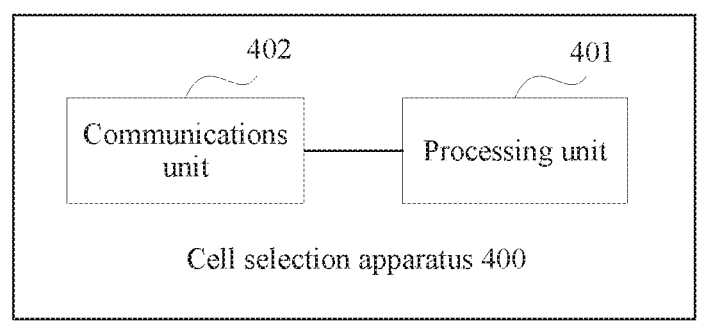
FIG. 4 is a structural diagram of a cell selection apparatus according to an embodiment of this application.

Based on the cell selection method provided in the foregoing embodiment, referring to FIG. 4, an embodiment of this application provides a cell selection apparatus 400. The apparatus 400 is applied to a terminal. FIG. 7 is a schematic structural diagram of the apparatus 400 according to an embodiment of the present invention. As shown in FIG. 4, the apparatus 400 includes a processing unit 401 and a communications unit 402.

The communications unit 402 is configured to: when the terminal camps on a first network that does not support a voice service, if the voice service needs to be initiated or received, fall back, in a circuit switched fallback CSFB manner, to a second network that supports the voice service.

The processing unit 401 is configured to: when the terminal fails to establish the voice service with the second network, save a location identifier of the first network and a location identifier of the second network to a blacklist as one record, where the blacklist includes at least one record, and the blacklist is used by the communications unit 402 to choose to camp on a cell of the second network when performing CSFB again.

Optionally, the communications unit 402 is further configured to:

when the terminal initiates or receives the voice service again, fall back to the second network based on CSFB; when a location area identity of the detected cell of the second network is different from a location area identity that is of the second network and that is allocated by the first network to the terminal before the terminal falls back to the second network, obtain a second location identifier of the first network on which the terminal camps before falling back to the second network, and obtain a first location identifier of the detected cell of the second network, where the first location identifier is a location area identity or a combination of a location area identity and a cell identity, and the second location identifier is a tracking area identity; and when the second location identifier and the first location identifier successfully match any record in the blacklist, skip choosing to camp on the detected cell of the second network, or set the detected cell of the second network as a to-be-camped-on cell with a low priority.

Optionally, the communications unit 402 is further configured to:

when the terminal initiates or receives the voice service again, fall back to the second network based on CSFB; when a location area identity of the detected cell of the second network is different from a location area identity that is of the second network and that is allocated by the first network to the terminal before the terminal falls back to the second network, obtain a second location identifier of the first network on which the terminal camps before falling back to the second network, and obtain a first location identifier of the detected cell of the second network, where the first location identifier is a location area identity or a combination of a location area identity and a cell identity, and the second location identifier is a tracking area identity; and when the blacklist includes no record that successfully matches the second location identifier and the first location identifier, choose to camp on the detected cell of the second network.

Optionally, any record in the blacklist further includes a quantity of voice service establishment failure times.

When the terminal fails to establish the voice service with the second network, the processing unit 401 is further configured to increase the quantity of voice service establishment failure times in the stored record by 1.

Optionally, the communications unit 402 is further configured to:

when the terminal initiates or receives the voice service again, fall back to the second network based on CSFB; when a location area identity of the detected cell of the second network is different from a location area identity that is of the second network and that is allocated by the first network to the terminal before the terminal falls back to the second network, obtain a second location identifier of the first network on which the terminal camps before falling back to the second network, and obtain a first location identifier of the detected cell of the second network, where the first location identifier is a location area identity or a combination of a location area identity and a cell identity, and the second location identifier is a tracking area identity and when the second location identifier and the first location identifier successfully match any record in the blacklist, and a quantity of voice service establishment failure times in the record is greater than a preset value, skip choosing to camp on the detected cell of the second network, or set the detected cell of the second network as a to-be-camped-on cell with a low priority.

Optionally, the communications unit 402 is further configured to:

when the terminal initiates or receives the voice service again, fall back to the second network based on CSFB, and when a location area identity of the detected cell of the second network is the same as a location area identity that is of the second network and that is allocated by the first network to the terminal before the terminal falls back to the second network, choose to camp on the detected cell of the second network.

Optionally, the communications unit 402 is further configured to:

when the communications component initiates or receives the voice service again, fall back from the first network to the second network based on CSFB; when a location area identity of the detected cell of the second network is different from a location area identity that is of the second network and that is allocated by the first network to the terminal before the terminal falls back to the second network, obtain, by the terminal, a first location identifier of the cell of the second network; when the first location identifier of the cell of the second network is the same as a location identifier of the second network in any record in the blacklist, obtain, by the terminal, a total quantity of voice service establishment failure times, where the total quantity of voice service establishment failure times is a sum of quantities of voice service establishment failure times in records that are in the blacklist and in which a location identifier of the second network is the same as the first location identifier and when the total quantity of voice service establishment failure times is greater than a preset value, skip choosing to camp on the detected cell of the second network, or set the detected cell of the second network as a to-be-camped-on cell with a low priority.

The first location identifier is a location area identity, a combination of a location area identity and a cell identity, or a combination of a location area identity, an absolute radio frequency channel number, and a base station identity code.

Optionally, the communications unit 402 is further configured to:

when the terminal initiates or receives the voice service again, fall back from the first network to the second network based on CSFB; when a location area identity of the detected cell of the second network is the same as a location area identity that is of the second network and that is allocated by the first network to the terminal before the terminal falls back to the second network, obtain a first location identifier of the cell of the second network and a second location identifier that is of the first network before the terminal falls back to the second network: and when the second location identifier and the first location identifier successfully match any record in the blacklist, and a quantity of voice service establishment failure times in the successfully matched record is greater than a preset value, skip choosing to camp on the detected cell of the second network, or set the detected cell of the second network as a to-be-camped-on cell with a low priority.

The first location identifier is a location area identity, a combination of a location area identity and a cell identity, or a combination of a location area identity, an absolute radio frequency channel number, and a base station identity code, and the second location identifier is a tracking area identity or a location area identity that is allocated by the first network to the terminal.

Optionally, the communications unit 402 is further configured to:

when the terminal initiates or receives the voice service again, fall back from the first network to the second network based on CSFB; and when a first location identifier of the detected cell of the second network is different from a location identifier of the second network in any record in the blacklist, choose to camp on the detected cell of the second network, where the first location identifier is a location area identity, a combination of a location area identity and a cell identity, or a combination of a location area identity, an absolute radio frequency channel number, and a base station identity code.

Optionally, the communications unit 402 is further configured to:

when the terminal initiates or receives the voice service again, fall back from the first network to the second network based on CSFB; and when a first location identifier of the detected cell of the second network is the same as a location identifier of the second network in any record in the blacklist, further detect whether a location area identity of the cell of the second network is the same as a location area identity that is allocated by the first network to the terminal before the terminal falls back to the second network, where the first location identifier is a location area identity, a combination of a location area identity and a cell identity, or a combination of a location area identity, an absolute radio frequency channel number, and a base station identity code;

when detecting that the location area identity of the cell of the second network is different from the location area identity that is allocated by the first network to the terminal before the terminal falls back to the second network, obtain a total quantity of voice service establishment failure times, where the total quantity of voice service establishment failure times is a sum of quantities of voice service establishment failure times in records that are in the blacklist and in which a location identifier of the second network is the same as the first location identifier; and when the total quantity of voice service establishment failure times is greater than a preset value, skip choosing to camp on the detected cell of the second network, or set the detected cell of the second network as a to-be-camped-on cell with a low priority.

Optionally, the communications unit 402 is further configured to:

when the terminal initiates or receives the voice service again, fall back from the first network to the second network based on CSFB; and when a first location identifier of the detected cell of the second network is the same as a location identifier of the second network in any record in the blacklist, further detect whether a location area identity of the cell of the second network is the same as a location area identity that is allocated by the first network to the terminal before the terminal falls back to the second network, where the first location identifier is a location area identity, a combination of a location area identity and a cell identity, or a combination of a location area identity, an absolute radio frequency channel number, and a base station identity code;

when detecting that the location area identity of the cell of the second network is the same as the location area identity that is allocated by the first network to the terminal before the terminal falls back to the second network, detect whether a second location identifier of the first network on which the terminal camps before falling back to the second network is the same as a location identifier of the first network in the record; and if the second location identifier of the first network on which the terminal camps before falling back to the second network is the same as the location identifier of the first network in the record, obtain a quantity of voice service establishment failure times in the record, where the second location identifier is a tracking area identity or a location area identity that is allocated by the first network to the terminal; and obtain a total quantity of voice service establishment failure times, where the total quantity of voice service establishment failure times is a sum of quantities of voice service establishment failure times that is calculated by the terminal: and when the total quantity of voice service establishment failure times is greater than a preset value, skip choosing to camp on the detected cell of the second network, or set the detected cell of the second network as a to-be-camped-on cell with a low priority.

Optionally, after choosing to camp on the detected cell of the second network, the communications unit 402 is further configured to:

obtain the second location identifier of the first network on which the terminal camps before falling back to the second network, and obtain the first location identifier of the detected cell of the second network, where the first location identifier is a location area identity or a combination of a location area identity and a cell identity, and the second location identity is a tracking area identity; and when the second location identifier and the first location identifier successfully match any record in the blacklist, delete the successfully matched record from the blacklist.

Optionally, the processing unit 401 is further configured to:

delete a record in the blacklist; and the deleting a record in the blacklist includes:

when the terminal initiates or receives the voice service again, falling back to the second network based on CSFB;

when the communications component 402 successfully establishes the voice service with the second network, obtaining a second location identifier of the first network on which the terminal camps before falling back to the second network, and obtaining a first location identifier of the detected cell of the second network; and when the second location identifier and the first location identifier successfully match any record in the blacklist, deleting the successfully matched record from the blacklist; or when the terminal initiates or receives the voice service again, falling back from the first network to the second network based on CSFB, performing cell handover after CSFB, and successfully establishing the voice service in a handed-over cell; when detecting that a second location identifier that is allocated by the first network to the terminal before CSFB and a first location identifier of the cell that is of the second network and on which the terminal camps first after CSFB successfully match any record in the blacklist, deleting the successfully matched record from the blacklist; and when detecting that the second location identifier that is allocated by the first network to the terminal before CSFB and a first location identifier of a cell that is of the second cell and on which the terminal camps after CSFB and handover successfully match any record in the blacklist, deleting the successfully matched record from the blacklist; or after the terminal is powered off, deleting all records in the blacklist; or setting valid time for any record in the blacklist, and when the valid time expires, deleting the record.

The first location identifier is a location area identity, a combination of a location area identity and a cell identity, or a combination of a location area identity, an absolute radio frequency channel number, and a base station identity code, and the second location identifier is a tracking area identity or a location area identity that is allocated by the first network to the terminal.

Optionally, that the second location identifier and the first location identifier successfully match any record in the blacklist includes:

if the second location identifier is the same as a location identifier of the first network in any record in the blacklist, and the first location identifier is the same as a location identifier of the second network in the record, determining that matching succeeds.

Optionally, the communications unit 402 is further configured to:

receive first information from a server or report first information to a server, where the first information includes at least one record; and the processing unit 401 is further configured to save the first information to the blacklist, where one record includes the location identifier of the first network and the location identifier of the second network.

Optionally, the location identifier of the first network is a tracking area identity of the first network or a location area identity of the first network, and the location identifier of the second network is a location area identity of the second network, a combination of a location area identity of the second network and a cell identity corresponding to the location area identity of the second network, or a combination of a location area identity, an absolute radio frequency channel number and a base station identity code.

Figure 5:
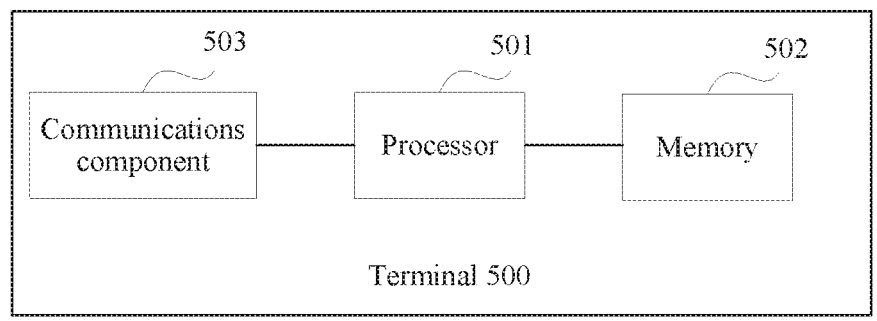
FIG. 5 is a structural diagram of a cell selection terminal according to an embodiment of this application.

Based on a same inventive concept, referring to FIG. 5, an embodiment of the present invention provides a cell selection terminal 500. FIG. 5 is a schematic structural diagram of the terminal 500 according to an embodiment of this application. As shown in FIG. 5, the terminal 500 includes a processor 501, a memory 502, and a communications component 503. Program code used to execute the solution in this application is stored in the memory 502, and execution of the program code is controlled by the processor 501.

The communications component 503 is configured to initiate or receive a voice service.

The processor 501 is configured to: when the terminal camps on a first network that does not support a voice service, if the communications component 503 initiates or receives the voice service, fall back, in a circuit switched fallback CSFB manner, to a second network that supports the voice service; and when the communications component 503 fails to establish the voice service with the second network, save a location identifier of the first network and a location identifier of the second network to a blacklist as one record, where the blacklist includes at least one record, and the blacklist is used by the processor to choose to camp on a cell of the second network when performing CSFB again.

The processor 501 is further configured to:

when the communications component 503 initiates or receives the voice service again, fall back to the second network based on CSFB; and when a location area identity of the detected cell of the second network is different from a location area identity that is of the second network and that is allocated by the first network to the terminal before the terminal falls back to the second network, obtain a second location identifier of the first network on which the terminal camps before falling back to the second network, and obtain a first location identifier of the detected cell of the second network, where the first location identifier is a location area identity or a combination of a location area identity and a cell identity, and the second location identifier is a tracking area identity; and when the second location identifier and the first location identifier successfully match any record in the blacklist, skip choosing to camp on the detected cell of the second network, or set the detected cell of the second network as a to-be-camped-on cell with a low priority.

Optionally, the processor 501 is further configured to:

when the communications component 503 initiates or receives the voice service again, fall back to the second network based on CSFB; and when a location area identity of the detected cell of the second network is different from a location area identity that is of the second network and that is allocated by the first network to the terminal before the terminal falls back to the second network, obtain a second location identifier of the first network on Which the terminal camps before falling back to the second network, and obtain a first location identifier of the detected cell of the second network, where the first location identifier is a location area identity or a combination of a location area identity and a cell identity, and the second location identifier is a tracking area identity; and when the blacklist includes no record that successfully matches the second location identifier and the first location identifier, choose to camp on the detected cell of the second network.

Optionally, any record in the blacklist further includes a quantity of voice service establishment failure times.

When the communications component 503 fails to establish the voice service with the second network, the processor 501 is further configured to increase the quantity of voice service establishment failure times in the stored record by 1.

Optionally, the processor 501 is further configured to:

when the communications component 503 initiates or receives the voice service again, fall back to the second network based on CSFB; and when a location area identity of the detected cell of the second network is different from a location area identity that is of the second network and that is allocated by the first network to the terminal before the terminal falls back to the second network, obtain a second location identifier of the first network on which the terminal camps before falling back to the second network, and obtain a first location identifier of the detected cell of the second network, where the first location identifier is a location area identity or a combination of a location area identity and a cell identity, and the second location identifier is a tracking area identity; and when the second location identifier and the first location identifier successfully match any record in the blacklist, and a quantity of voice service establishment failure times in the record is greater than a preset value, skip choosing to camp on the detected cell of the second network, or set the detected cell of the second network as a to-be-camped-on cell with a low priority.

Optionally, the processor 501 is further configured to:

when the communications component 503 initiates or receives the voice service again, fall back to the second network based on CSFB; and when a location area identity of the detected cell of the second network is the same as a location area identity that is of the second network and that is allocated by the first network to the terminal before the terminal falls back to the second network, choose to camp on the detected cell of the second network.

Optionally, the processor 501 is further configured to:

when the communications component 503 initiates or receives the voice service again, fall back from the first network to the second network based on CSFB; when a location area identity of the detected cell of the second network is different from a location area identity that is of the second network and that is allocated by the first network to the terminal before the terminal falls back to the second network, obtain, by the terminal, a first location identifier of the cell of the second network; when the first location identifier of the cell of the second network is the same as a location identifier of the second network in any record in the blacklist, obtain, by the terminal, a total quantity of voice service establishment failure times, where the total quantity of voice service establishment failure times is a sum of quantities of voice service establishment failure times in records that are in the blacklist and in which a location identifier of the second network is the same as the first location identifier; and when the total quantity of voice service establishment failure times is greater than a preset value, skip choosing to camp on the detected cell of the second network, or set the detected cell of the second network as a to-be-camped-on cell with a low priority.

The first location identifier is a location area identity, a combination of a location area identity and a cell identity, or a combination of a location area identity, an absolute radio frequency channel number, and a base station identity code.

Optionally, the processor 501 is further configured to:

when the communications component 503 initiates or receives the voice service again, fall back from the first network to the second network based on CSFB; when a location area identity of the detected cell of the second network is the same as a location area identity that is of the second network and that is allocated by the first network to the terminal before the terminal falls back to the second network, obtain a first location identifier of the cell of the second network and a second location identifier that is of the first network before the terminal falls back to the second network; and when the second location identifier and the first location identifier successfully match any record in the blacklist, and a quantity of voice service establishment failure times in the successfully matched record is greater than a preset value, skip choosing to camp on the detected cell of the second network, or set the detected cell of the second network as a to-be-camped-on cell with a low priority.

The first location identifier is a location area identity, a combination of a location area identity and a cell identity, or a combination of a location area identity, an absolute radio frequency channel number, and a base station identity code, and the second location identifier is a tracking area identity or a location area identity that is allocated by the first network to the terminal.

Optionally, the processor 501 is further configured to:

when the communications component 503 initiates or receives the voice service again, fall back from the first network to the second network based on CSFB; and when a first location identifier of the detected cell of the second network is different from a location identifier of the second network in any record in the blacklist, choose to camp on the detected cell of the second network, where the first location identifier is a location area identity, a combination of a location area identity and a cell identity, or a combination of a location area identity, an absolute radio frequency channel number, and a base station identity code.

Optionally, the processor 501 is further configured to:

when the communications component 503 initiates or receives the voice service again, fall back from the first network to the second network based on CSFB; and when a first location identifier of the detected cell of the second network is the same as a location identifier of the second network in any record in the blacklist, further detect whether a location area identity of the cell of the second network is the same as a location area identity that is allocated by the first network to the terminal before the terminal falls back to the second network. Where the first location identifier is a location area identity, a combination of a location area identity and a cell identity, or a combination of a location area identity, an absolute radio frequency channel number, and a base station identity code; and when detecting that the location area identity of the cell of the second network is different from the location area identity that is allocated by the first network to the terminal before the terminal falls back to the second network, obtain a total quantity of voice service establishment failure times, where the total quantity of voice service establishment failure times is a sum of quantities of voice service establishment failure times in records that are in the blacklist and in which a location identifier of the second network is the same as the first location identifier; and when the total quantity of voice service establishment failure times is greater than a preset value, skip choosing to camp on the detected cell of the second network, or set the detected cell of the second network as a to-be-camped-on cell with a low priority.

Optionally, the processor 501 is further configured to:

when the communications component 503 initiates or receives the voice service again, fall back from the first network to the second network based on CSFB; and when a first location identifier of the detected cell of the second network is the same as a location identifier of the second network in any record in the blacklist, further detect whether a location area identity of the cell of the second network is the same as a location area identity that is allocated by the first network to the terminal before the terminal falls back to the second network, where the first location identifier is a location area identity, a combination of a location area identity and a cell identity, or a combination of a location area identity, an absolute radio frequency channel number, and a base station identity code;

when detecting that the location area identity of the cell of the second network is the same as the location area identity that is allocated by the first network to the terminal before the terminal falls back to the second network, detect whether a second location identifier of the first network on which the terminal camps before falling back to the second network is the same as a location identifier of the first network in the record; and if the second location identifier of the first network on which the terminal camps before falling back to the second network is the same as the location identifier of the first network in the record, obtain a quantity of voice service establishment failure times in the record, where the second location identifier is a tracking area identity or a location area identity that is allocated by the first network to the terminal; and obtain a total quantity of voice service establishment failure times, where the total quantity of voice service establishment failure times is a sum of quantities of voice service establishment failure times that is calculated by the terminal; and when the total quantity of voice service establishment failure times is greater than a preset value, skip choosing to camp on the detected cell of the second network, or set the detected cell of the second network as a to-be-camped-on cell with a low priority.

Optionally, after choosing to camp on the detected cell of the second network, the processor 501 is further configured to:

obtain the second location identifier of the first network on which the terminal camps before falling back to the second network, and obtain the first location identifier of the detected cell of the second network, where the first location identifier is a location area identity or a combination of a location area identity and a cell identity, and the second location identity is a tracking area identity; and when the second location identifier and the first location identifier successfully match any record in the blacklist, delete the successfully matched record from the blacklist.

Optionally, the processor 501 is further configured to:

delete a record in the blacklist; and the deleting a record in the blacklist includes:

when the communications component 503 initiates or receives the voice service again, falling back to the second network based on CSFB; when the communications component 503 successfully establishes the voice service with the second network, obtaining a second location identifier of the first network on which the terminal camps before falling back to the second network, and obtaining a first location identifier of the detected cell of the second network; and when the second location identifier and the first location identifier successfully match any record in the blacklist, deleting the successfully matched record from the blacklist; or when the communications component 503 initiates or receives the voice service again, falling back from the first network to the second network based on CSFB, performing cell handover after CSFB, and successfully establishing the voice service in a handed-over cell; when detecting that a second location identifier that is allocated by the first network to the terminal before CSFB and a first location identifier of the cell that is of the second network and on which the terminal camps first after CSFB successfully match any record in the blacklist, deleting the successfully matched record from the blacklist; and when detecting that the second location identifier that is allocated by the first network to the terminal before CSFB and a first location identifier of a cell that is of the second cell and on which the terminal camps after CSFB and handover successfully match any record in the blacklist, deleting the successfully matched record from the blacklist; or after the terminal is powered off, deleting all records in the blacklist; or setting valid time for any record in the blacklist, and when the valid time expires, deleting the record.

The first location identifier is a location area identity, a combination of a location area identity and a cell identity, or a combination of a location area identity, an absolute radio frequency channel number, and a base station identity code, and the second location identifier is a tracking area identity or a location area identity that is allocated by the first network to the terminal.

Optionally, that the second location identifier and the first location identifier successfully match any record in the blacklist includes:

if the second location identifier is the same as a location identifier of the first network in any record in the blacklist, and the first location identifier is the same as a location identifier of the second network in the record, determining that matching succeeds.

Optionally, the communications component 503 is further configured to:

receive first information from a server or report first information to a server, where the first information includes at least one record; and the processor 501 is further configured to save the first information to the blacklist, where one record includes the location identifier of the first network and the location identifier of the second network.

Optionally, the location identifier of the first network is a tracking area identity of the first network or a location area identity of the first network, and the location identifier of the second network is a location area identity of the second network, a combination of a location area identity of the second network and a cell identity corresponding to the location area identity of the second network, or a combination of a location area identity, an absolute radio frequency channel number, and a base station identity code.

In this embodiment of this application, the processor 501 is connected to all parts of the entire terminal by using various interfaces and lines, and performs the method shown in FIG. 2 by running or executing a software program and/or a module stored in a storage unit and invoking data stored in the memory 502. The processor 501 may include an integrated circuit (Integrated Circuit, IC), for example, may include a single packaged IC, or may be formed by connecting a plurality of packaged ICs with a same function or different functions. For example, the processor 501 may include only a central processing unit (Central Processing Unit, CPU), or may be a combination of a CPU, a digital signal processor (Digital Signal Processor, DSP), and a control chip such as a baseband chip in the communications component 503. In this implementation of this application, the CPU may include a single computing core, or may include a plurality of computing cores.

The communications component 503 in this embodiment of the present invention is configured to establish a voice communication channel, so that the terminal connects to a remote server by using the communications channel, and receives voice data from the remote server.

The cell selection method in FIG. 2 is described in detail below by using an example in which the first network is an LTE network and the second network is a 2G or 3G network.

When the terminal receives a new incoming call or initiates a call in the LTE network, and falls back to a CS domain network of UTRAN/GERAN or a GSM network in a CSFB manner, and a voice service fails to be established because an exception occurs in a CS domain, an AS stratum of the terminal records a second location identifier that is allocated by the LTE network to the terminal before CSFB and a first location identifier of a CS domain cell in which the voice service fails to be established after CSFB. The second location identifier is used as a location identifier of the first network, the first location identifier is used as a location identifier of the second network, and the first location identifier and the second location identifier form one record in the blacklist, where the record is used by the terminal when the terminal performs cell selection after falling back to a CS domain again.

In this application, the second location identifier may be a TAI allocated by the LTE network to the terminal, or a LAI allocated by the LTE network to the terminal; and the first location identifier may be a LAI of the CS domain cell, or the first location identifier may be an identifier used to identify the CS domain cell. Specifically, the identifier used to identify the CS domain cell may be a combination of a LAI of the CS domain cell and a cell identity, or a combination of a LAI of the CS domain cell and another identifier used to identify a cell. The another identifier used to identify a cell may be a combination of an ARFCN and a BSIC. The LAI is a combination of a public land mobile network identity PLMN ID (Public Land Mobile Network identity) and a location area code LAC (location area code).

In this application, a form and content of the second location identifier correspond to a form and content of the location identifier of the first network, and a form and content of the first location identifier correspond to a form and content of the location identifier of the second network.

In addition, any record in the blacklist further includes a quantity of voice service establishment failure times. To be specific, when the voice service fails to be established after CSFB, the second location identifier before CSFB and the first location identifier after CSFB are recorded in the blacklist; and if a record that is the same as the second location identifier and the first location identifier exists in the blacklist, a quantity of voice service establishment failure times in the record is increased by 1; or if the blacklist includes no record that is the same as the second location identifier and the first location identifier, a record that includes the first location identifier and the second location identifier is newly created, and a quantity of voice service establishment failure times in the record is marked as 1.

Optionally, the terminal may set a validity period for each record. For example, the validity period of each record is 24 hours, and when a validity period of a record expires, the terminal may delete or maintain the record.

It should be noted that, after the terminal successfully executes the voice service at a location of a corresponding record in the blacklist, the corresponding record needs to be deleted. To be specific, the voice service is successfully established after CSFB, and the terminal checks whether a second location identifier allocated by the LTE network to the terminal before CSFB and a first location identifier of a CS domain cell after CSFB match any record in the blacklist, and deletes the record if the matching succeeds. Specially, if the terminal performs cell handover after CSFB, and the voice service is successfully established in a handed-over cell, the terminal needs to check whether the second location identifier allocated by the LTE network to the terminal before CSFB and a first location identifier of a CS domain cell on which the terminal camps first after CSFB match any record in the blacklist, and delete the record if the matching succeeds. In addition, the terminal further needs to check whether the second location identifier allocated by the LTE network to the terminal before CSFB and a first location identifier of a CS domain cell on which the terminal camps after CSFB and handover match any record in the blacklist, and delete the record if the matching succeeds. In addition, when the terminal is powered off, records in the blacklist are cleared.

It should be noted that, in this application, determining whether the second location identifier and the first location identifier match any record in the blacklist includes: comparing the second location identifier with a location identifier of the first network in any record in the blacklist, and comparing the first location identifier with a location identifier of the second network in the record; and if the second location identifier is the same as the location identifier of the first network and the first location identifier is the same as the location identifier of the second network, determining that the matching succeeds; or if the second location identifier is different from the location identifier of the first network, or the first location identifier is different from the location identifier of the second network, determining that the matching fails.

Specifically, a record in the blacklist may be in a form shown in Table 2.

TABLE 2

Second location identifier allocated by LTE to a terminal
First location identifier of UMTS/GERAN/GSM
Quantity of voice service establishment failure times
Time at which a voice service fails to be established for the last time Further, the first location identifier of UMTS/GERAN/GSM in Table 2 may be shown in Table 3, Table 4, and Table 5.

TABLE 3

PLMN ID
LAC

TABLE 4

PLMN ID (MCC + MNC)
LAC
ARFCN
BSIC

TABLE 5

PLMN ID (MCC + MNC)
LAC
Cell ID

After the terminal detects CSFB, there are a plurality of manners in which the voice service fails to be established because an exception occurs in the voice service. For example, after CSFB, the terminal determines, by detecting that a CS domain connection of the terminal is normally released, that the voice service fails to be established.

Figure 6A:
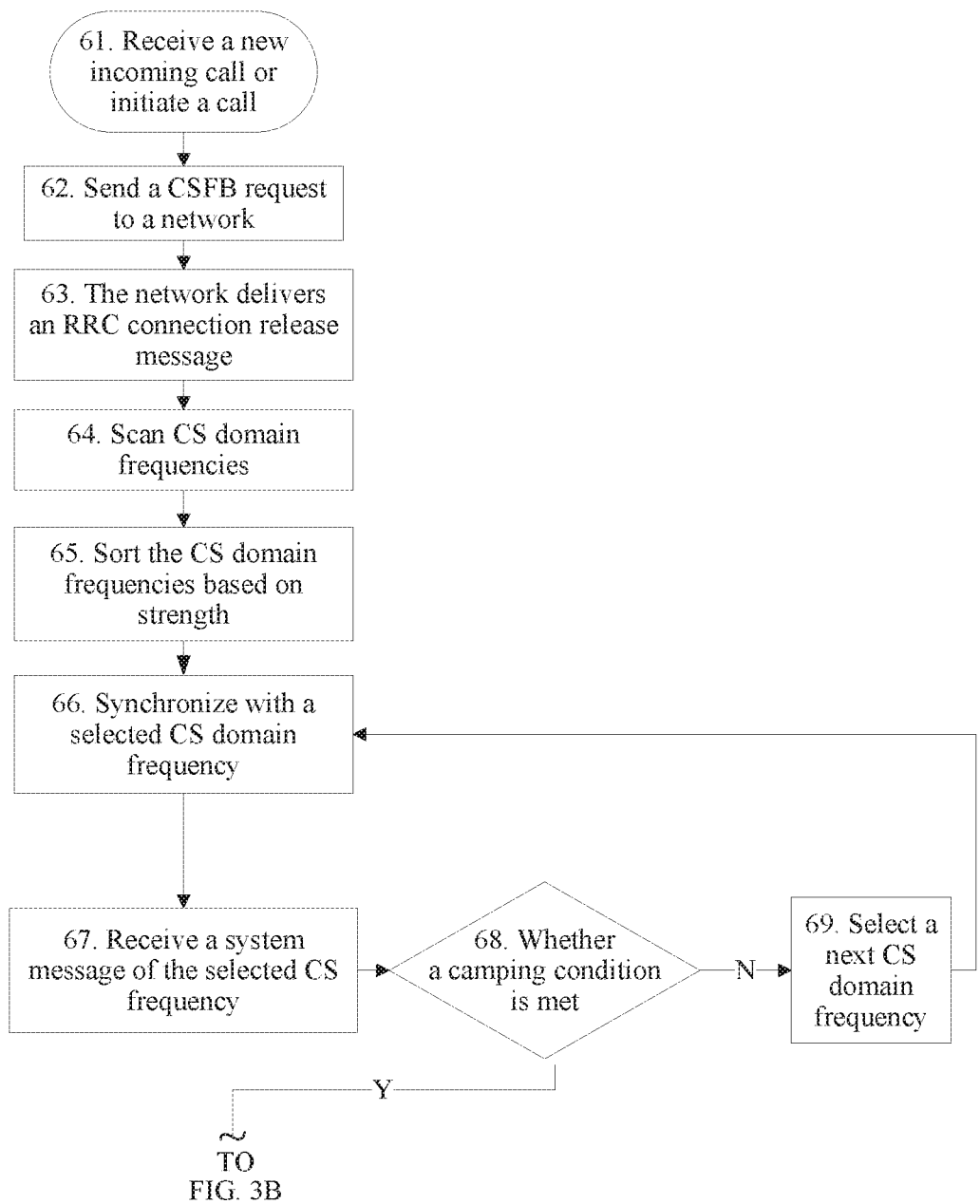
FIG. 6A and FIG. 6B are a schematic diagram of a CSFB process after a call is initiated or a call is received in an LTE network according to an embodiment of this application.
Figure 6B:
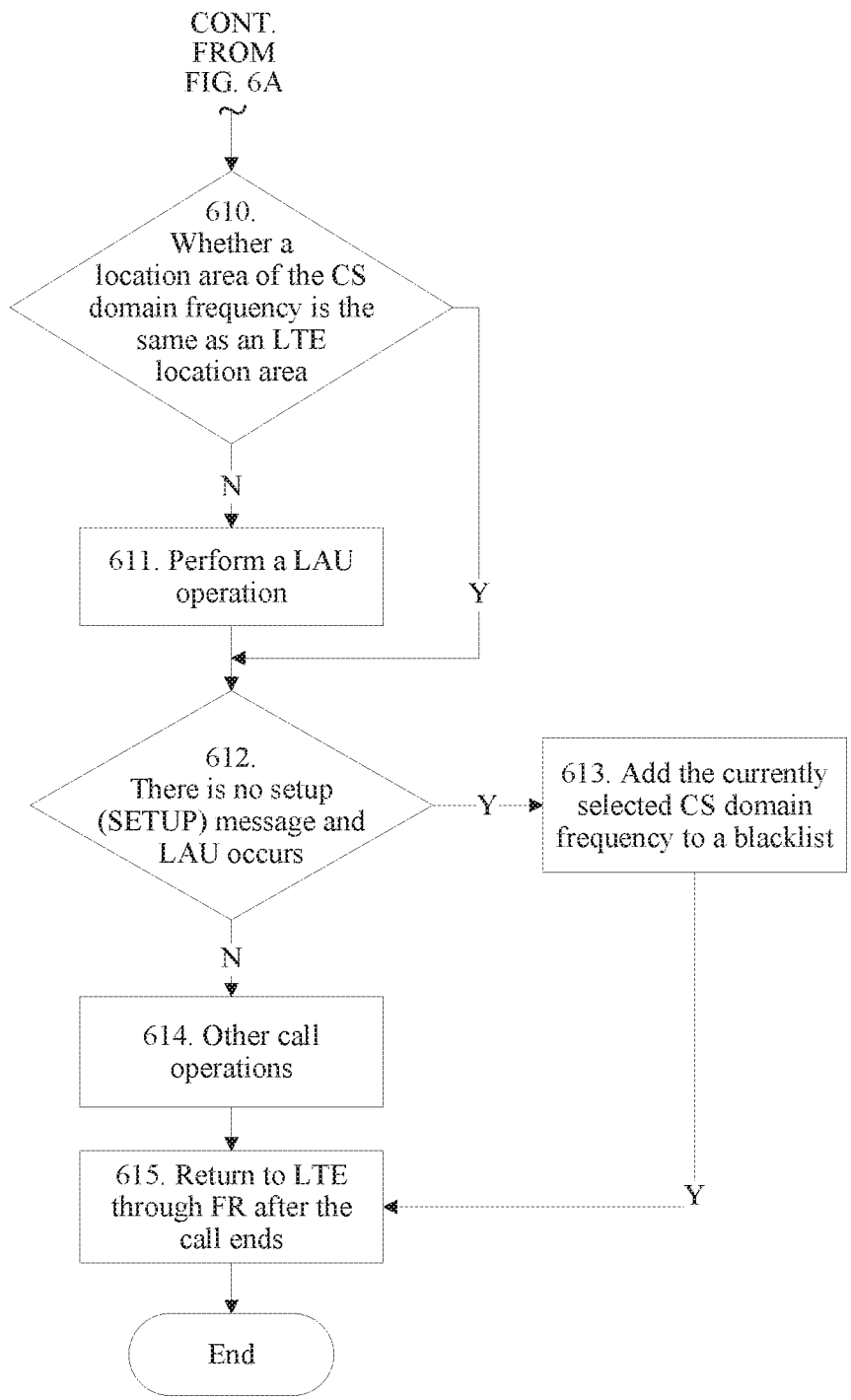

When the terminal establishes the voice service in a CSFB manner again, the terminal selects a CS domain cell by using the blacklist. For a specific procedure, refer to FIG. 6A and FIG. 6B.

Step 61: The terminal receives a new incoming call or initiates a call in an LTE network.

Step 62: The terminal sends a CSFB request to the LTE network, to request to fall back to a CS domain to execute a voice service.

Step 63: The LTE network sends an RRC connection release message to the terminal, and adds, to the RRC connection release message, information about a CS domain frequency to which the terminal needs to fall back through CSFB.

Step 64: The terminal scans CS domain frequencies delivered by the LTE network, and receives receiving strength of the CS domain frequency.

Step 65: The terminal sorts, based on strength, priorities of the CS domain frequencies delivered by the LTE network, where better strength indicates a higher priority, and the terminal selects a CS domain frequency in a priority sequence.

Step 66: Perform a synchronization operation on the selected CS domain frequency.

Step 67: If the terminal is successfully synchronized with the selected CS domain frequency, the terminal receives a system message of the selected CS domain frequency.

Step 68: The terminal camps on a cell of the selected CS domain frequency, and performs step 610 if a camping condition is met, or performs step 69 if the camping condition is not met.

In this embodiment, a cell selection process is performed based on the following steps:

The terminal determines whether a LAI of a cell on which the terminal camps after CSFB is the same as a LAI allocated by the LTE network to the terminal before CSFB.

If the LAIs are the same, the terminal determines whether a record that successfully matches a second location identifier allocated by the LTE network to the terminal before CSFB and a first location identifier of a CS domain cell after CSFB exists in a blacklist; if there is a successfully matched record, the terminal obtains a quantity of voice service establishment failure times in the successfully matched record; and when the quantity of voice service establishment failure times is greater than a preset value, the terminal reduces a priority of the CS domain cell, for example, sets the priority to FORBIDDEN, performs step 69, and attempts to camp on the CS domain cell only when there is no available cell; or if the quantity of voice service establishment failure times in the successfully matched record is less than or equal to the preset value, the terminal performs step 610. For a meaning of successfully matching the second location identifier and the first location identifier with a record in the blacklist, refer to related descriptions in this application. Details are not described herein again.

If the LAIs are different, the terminal determines whether the blacklist includes any record in which a location identifier of the second network is the same as a first location identifier of a CS domain cell after CSFB; if there is a record in which the location identifier of the second network is the same as the first location identifier of the CS domain cell after CSFB, the terminal obtains a total quantity of voice service establishment failure times, where the total quantity of voice service establishment failure times is a sum of quantities of voice service establishment failure times in all records in which a location identifier of the second network is the same as the first location identifier of the CS domain cell after CSFB: and when the total quantity of voice service establishment failure times is greater than a preset value, the terminal reduces a priority of the CS domain cell, for example, sets the priority to FORBIDDEN, performs step 69, and attempts to camp on the CS domain cell only when there is no available cell; or when the total quantity of voice service establishment failure times is less than or equal to the preset value, the terminal performs step 610.

During specific implementation, the following implementation may be used for execution, and the following process is included.

Q1: The terminal determines whether the first location identifier of the CS domain cell after CSFB is the same as a location identifier of the second network in any record in the blacklist.

Based on definitions of the first location identifier and the location identifier of the second network, this may be specifically as follows: Determining whether a LAI of the CS domain cell after CSFB is the same as a LAI that is in any record in the blacklist and that is of a CS domain cell in which a voice service fails to be established after CSFB, or determining whether an identity of a CS domain cell on which the terminal camps after CSFB is the same as an identity that is in any record in the blacklist and that is of a cell in which a voice service fails to be established after CSFB. For a format of an identity of a corresponding CS domain cell, refer to the foregoing descriptions. Details are not described herein again.

Q2: If the first location identifier of the CS domain cell on which the terminal camps after CSFB is the same as the location identifier of the second network in the record in the blacklist, the terminal further determines whether a LAI of the cell on which the terminal camps after CSFB is the same as a LAI allocated by the LTE network to the terminal before CSFB.

Q21: If the LAIs are the same, the terminal checks whether the second location identifier allocated by the LTE network to the terminal before CSFB is the same as a location identifier of the first network in the record; and if the second location identifier allocated by the LTE network to the terminal before CSFB is the same as a location identifier of the first network in the record, a quantity of voice service establishment failure times in the record is added to the total quantity of voice service establishment failure times. It should be noted that an initial value of the total quantity of voice service establishment failure times is 0. The terminal returns to step Q1 to repeatedly perform the foregoing process, to traverse records in the blacklist. If the total quantity of voice service establishment failure times is greater than a preset value, the terminal reduces a priority of the CS domain cell, for example, sets the priority to FORBIDDEN, performs step 69, and attempts to camp on the CS domain cell only when there is no available cell; or if the total quantity of voice service establishment failure times in the matched record is less than the preset value, the terminal performs step 610.

Q22: If the LAIs are different, the terminal adds a quantity of voice service establishment failure times in the record to the total quantity of voice service establishment failure times. The terminal returns to step Q1 to repeatedly perform the foregoing process, to traverse records in the blacklist. If the total quantity of voice service establishment failure times is greater than a preset value, the terminal reduces a priority of the CS domain cell, for example, sets the priority to FORBIDDEN, performs step 69, and attempts to camp on the CS domain cell only when there is no available cell; or if the total quantity of voice service establishment failure times is less than the preset value, the terminal performs step 610. For example, the blacklist includes three records in which a location identifier of the second network is the same as the first location identifier, and in this case, a sum of quantities of voice service establishment failure times corresponding to the three records is calculated, and if the sum of the quantities of voice service establishment failure times is greater than the preset value, the priority of the CS domain cell is reduced.

Q3: The terminal directly performs step 610 if the first location identifier of the CS domain cell on which the terminal camps after CSFB is different from a location identifier of the second network in any record in the blacklist.

It should be noted that the terminal may set a validity period for each record, and when the validity period expires, the terminal may not delete the record. Therefore, in the process described in step 68, when checking a record in the blacklist, the terminal needs to check whether the record is in a validity period, and if the record is not in the validity period, the terminal does not count a quantity of times in the record.

It should be noted that the preset value may be flexibly configured by the terminal based on an actual case. To be specific, when a quantity of occurrence times is greater than the preconfigured preset value, a cell of the CS domain frequency is set as a to-be-camped-on cell with a low priority.

Step 69: The terminal continues to select a next CS domain frequency based on a sequence of the priorities of the CS domain frequencies, and returns to step 66.

Step 610: If the cell currently meets an access condition, camp on the cell, and further determine whether a location area of the selected CS domain frequency is the same as a location area to which the terminal is attached in the LTE network; and if the location areas are the same, perform step 612; or if the location areas are different, perform step 611.

Step 611: The terminal performs a LAU operation on the selected CS domain frequency, and further performs step 612.

Step 612: When establishing a voice service at the selected CS domain frequency, the terminal determines whether a voice setup message is successfully sent or received; and if yes, performs step 614; otherwise, performs step 613.

Step 613: Add the second location identifier of the LTE network before fallback and the first location identifier of the cell of the selected CS domain frequency to the blacklist.

Specifically, the second location identifier is used as the location identifier of the first network, and the first location identifier is used as the location identifier of the second network, to form one record in the blacklist.

Step 614: After successfully falling back to a CS domain, the terminal performs a subsequent operation of a voice call.

Step 615: The terminal returns to the LTE network through FR after the voice call ends.

It should be noted that in actual application, in the foregoing embodiment of this application, the terminal may read system information to obtain the first location identifier of the CS domain cell and the second location identifier allocated by the LTE network to the terminal; or the terminal has already obtained system information from a network side and cached the system information on the terminal locally, and the terminal locally obtains the first location identifier of the CS domain cell and the second location identifier allocated by the LTE network to the terminal.

A person skilled in the art should understand that the embodiments of this application may be provided as a method, a system, or a computer program product. Therefore, the embodiments of this application may use a form of hardware only embodiments, software only embodiments, or embodiments with a combination of software and hardware. Moreover, the embodiments of this application may use a form of a computer program product that is implemented on one or more computer-usable storage media (including but not limited to a disk memory, a CD-ROM, an optical memory, and the like) that include computer-usable program code.

The embodiments of this application are described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, to generate computer-implemented processing. Therefore, the instructions executed on the computer or the another programmable device provide steps for implementing a specific function in one or more processes in the flowcharts and/or in one or more blocks in the block diagrams.

Obviously, a person skilled in the art can make various modifications and variations to embodiments of this application without departing from the spirit and scope of this application. In this way, this application is intended to cover these modifications and variations provided that they fall within the scope of protection defined by the following claims and their equivalent technologies.

What is claimed is:

1. A cell selection method implemented by a terminal, comprising:
    camping on a first network that is not supporting a voice service;
    initiating or receiving the voice service;
    falling back, in a circuit-switched fallback (CSFB) manner, to a second network that is supporting the voice service;
    identifying that the terminal has failed to establish the voice service with the second network;
    saving, in response to the identifying, a first location identifier of the first network and a location identifier of the second network to a blacklist as a record, wherein the record further comprises a quantity of voice service establishment failure times, and wherein the blacklist is to be used by the terminal to choose to camp on a cell of the second network when performing CSFB subsequently;

increasing, in response to the identifying, the quantity of voice service establishment failure times by one;

obtaining the quantity of voice service establishment failure times in the record;

obtaining a total number of unsuccessful established voice services, wherein the total number of unsuccessful established voice services comprises a sum of the quantity of voice service establishment failure times; and skipping choosing to camp on the cell or setting the cell as a to-be-camped-on cell with a low priority when the total number of unsuccessful established voice service is greater than a preset value.

2. The cell selection method of claim 1, further comprising:

initiating or receiving the voice service again;

falling back from the first network to the second network based on the CSFB;

detecting a location area identity of the cell;

identifying that the location area identity of the cell is different from a location area identity that is allocated to the terminal from the first network before the terminal falls back to the second network;

obtaining, in response to identifying that the location area identity of the cell is different from the location area identity that is allocated to the terminal from the first network before the terminal falls back to the second network, a second location identifier of the first network, wherein the second location identifier of the first network is a tracking area identity or a location area identity;

obtaining a first location identifier of the cell, wherein the first location identifier of the cell is a location area identity or a combination of the location area identity and a cell identity;

identifying that the second location identifier of the first network and the first location identifier of the cell match any record in the blacklist and that the quantity of voice service establishment failure times is greater than a preset value; and skipping choosing to camp on the cell or setting the cell as a to-be-camped-on cell with a low priority in response to the identifying that the second location identifier of the first network and the first location identifier of the cell match any record in the blacklist and that the quantity of voice service establishment failure times is greater than the preset value.

3. The cell selection method of claim 2, wherein that the second location identifier and the first location identifier match any record in the blacklist comprises:

identifying that the second location identifier of the first network is the same as the location identifier of the first network in the record and that the first location identifier of the cell is the same as the location identifier of the second network in the record; and determining that the second location identifier and the first location identifier match the record in the blacklist.

4. The cell selection method of claim 1, further comprising:

initiating or receiving the voice service again;

falling back from the first network to the second network based on the CSFB;

obtaining, from the first network, a location area identity that is allocated to the terminal before the terminal falls back to the second network;

identifying that a location area identity of the cell is the same as the location area identity that is allocated to the terminal before the terminal falls back to the second network; and choosing, in response to the identifying that the location area identity of the cell is the same as the location area identity that is allocated to the terminal before the terminal falls back to the second network, to camp on the cell.

5. The cell selection method of claim 1, further comprising:

initiating or receiving the voice service again;

falling back from the first network to the second network based on the CSFB;

obtaining a first location identifier of the cell, wherein the first location identifier of the cell is a location area identity, a combination of the location area identity and a cell identity, or a combination of the location area identity, an absolute radio frequency channel number, and a base station identity code;

detecting that the first location identifier of the cell is different from the location identifier of the second network in any record in the blacklist; and choosing, in response to the detecting that the first location identifier of the cell is different from the location identifier of the second network, to camp on the cell of the second network.

6. The cell selection method of claim 1, further comprising:

initiating or receiving the voice service again;

falling back from the first network to the second network based on the CSFB;

obtaining a first location identifier of the cell, wherein the first location identifier of the cell is a location area identity, a combination of the location area identity and a cell identity, or a combination of the location area identity, an absolute radio frequency channel number, and a base station identity code;

detecting that the first location identifier of the cell is same as a location identifier of the second network in any record in the blacklist;

detecting whether a location area identity of the cell is same as the location area identity that is allocated to the terminal by the first network before the terminal falls back to the second network, wherein obtaining the total number of unsuccessful established voice services further comprises detecting that the location area identity of the cell is not the same as the location area identity that is allocated to the terminal by the first network before the terminal falls back to the second network, and wherein the total number of unsuccessful established voice service further comprises a sum of the quantity of voice service establishment failure times in each record in which the location identifier of the second network and the first location identifier of the cell is the same.

7. The cell selection method of claim 1, further comprising:

initiating or receiving the voice service again;

falling back from the first network to the second network based on the CSFB;

obtaining a first location identifier of the cell, wherein the first location identifier of the cell is a location area identity, a combination of the location area identity and a cell identity, or a combination of the location area identity, an absolute radio frequency channel number, and a base station identity code;

detecting that the first location identifier of the cell is same as the location identifier of the second network in any record in the blacklist;

detecting whether a location area identity of the cell is same as a location area identity that is allocated to the terminal by the first network before the terminal falls back to the second network;

obtaining a second location identifier of the first network when detecting that the location area identity of the cell is same as the location area identity that is allocated to the terminal by the first network before the terminal falls back to the second network, wherein the second location identifier of the first network is a tracking area identity or a location area identity;

detecting whether the second location identifier of the first network is same as the first location identifier of the first network in this record that is the first location identifier of the cell is same as the location identifier of the second network; and deleting all records in the blacklist after the terminal is powered off.

8. The cell selection method of claim 1, further comprising:

setting a valid time for the record in the blacklist and deleting the record when the valid time expires; or initiating or receiving the voice service again, falling back from the first network to the second network based on the CSFB, obtaining a second location identifier of the first network and a first location identifier of the cell when the voice service is successfully established in the second network, detecting that the second location identifier of the first network and the first location identifier of the cell match any record in the blacklist, and deleting that matched record, wherein the first location identifier of the cell is a location area identity, a combination of the location area identity and a cell identity, or a combination of the location area identity, an absolute radio frequency channel number, and a base station identity code, and wherein the second location identifier of the first network is a tracking area identity or a location area identity.

9. The cell selection method of claim 8, wherein that the second location identifier and the first location identifier match any record in the blacklist comprises:

identifying that the second location identifier of the first network is the same as the location identifier of the first network in the record and that the first location identifier of the cell is the same as the location identifier of the second network in the record; and determining that the second location identifier and the first location identifier match the record in the blacklist.

10. The cell selection method of claim 1, wherein the location identifier of the first network is a tracking area identity of the first network or a location area identity of the first network, and wherein the location identifier of the second network is a location area identity of the second network, a combination of the location area identity of the second network and a cell identity corresponding to the location area identity of the second network, or a combination of the location area identity of the second network, an absolute radio frequency channel number, and a base station identity code.

11. A terminal comprising:

a processor configured to camp on a first network that is not supporting a voice service; and a communications component coupled to the processor and configured to initiate or receive the voice service, wherein the processor is further configured to:

fall back, in a circuit-switched fallback (CSFB) manner, to a second network that is supporting the voice service;

identify that the terminal had failed to establish the voice service with the second network;

save, in response to the identifying, a first location identifier of the first network and a location identifier of the second network to a blacklist as a record, wherein the record further comprises a quantity of voice service establishment failure times, and wherein the blacklist is to be used by the terminal to choose to camp on a cell of the second network when performing CSFB again;

increase, in response to the identifying, the quantity of voice service establishment failure times by one;

obtain the quantity of voice service establishment failure times in this record;

obtain a total number of unsuccessful established voice services, wherein the total number of unsuccessful established voice services comprises a sum of the quantity of voice service establishment failure times; and skip choosing to camp on the cell or setting the cell as a to-be-camped-on cell with a low priority when the total number of unsuccessful established voice service is greater than a preset value.

12. The terminal of claim 11, wherein the communications component is further configured to initiate or receive the voice service again, and wherein the processor is further configured to:

fall back from the first network to the second network based on the CSFB;

detect a location area identity of the cell;

identify that the location area identity of the cell is different from a location area identity that is allocated to the terminal from the first network before the terminal falls back to the second network;

obtain, in response to the identifying that the location area identity of the cell is different from a location area identity that is allocated to the terminal from the first network before the terminal falls back to the second network, a second location identifier of the first network, wherein the second location identifier of the first network is a tracking area identity or a location area identity;

obtain a first location identifier of the cell, wherein the first location identifier of the cell is a location area identity or a combination of the location area identity and a cell identity;

identify that the second location identifier of the first network and the first location identifier of the cell match any record in the blacklist and that the quantity of voice service establishment failure times is greater than a preset value; and skip choosing to camp on the cell or set the cell as a to-be-camped-on cell with a low priority in response to identifying that the second location identifier of the first network and the first location identifier of the cell match any record in the blacklist and that the quantity of voice service establishment failure times is greater than the preset value.

13. The terminal of claim 12, wherein the processor is further configured to:
identify that the second location identifier of the first network is the same as the location identifier of the first network in the record in the blacklist and the first location identifier of the cell is the same as the location identifier of the second network in the record; and
determine that the second location identifier and the first location identifier match the record in the blacklist.

14. The terminal of claim 11, wherein the communications component is further configured to initiate or receive the voice service again, and wherein the processor is further configured to:
fall back from the first network to the second network based on the CSFB;
obtain, from the first network, a location area identity that is allocated to the terminal before the terminal falls back to the second network;
identify that a location area identity of the cell is the same as the location area identity that is allocated to the terminal before the terminal falls back to the second network; and
choose, in response to the identifying that the location area identity of the cell is the same as the location area identity that is allocated to the terminal before the terminal falls back to the second network, to camp on the cell.

15. The terminal of claim 11, wherein the communications component is further configured to initiate or receive the voice service again, and wherein the processor is further configured to:
fall back from the first network to the second network based on the CSFB;
obtain a first location identifier of the cell, wherein the first location identifier of the cell is a location area identity, a combination of the location area identity and a cell identity, or a combination of the location area identity, an absolute radio frequency channel number, and a base station identity code;
detect that the first location identifier of the cell is different from the location identifier of the second network in any record in the blacklist; and
choose, in response to the detecting that the first location identifier of the cell is different from the location identifier of the second network, to camp on the cell of the second network.

16. The terminal of claim 11, wherein the communications component is further configured to initiate or receive the voice service again, and wherein the processor is further configured to:
fall back from the first network to the second network based on the CSFB;
obtain a first location identifier of the cell, wherein the first location identifier of the cell is a location area identity, a combination of the location area identity and a cell identity, or a combination of the location area identity, an absolute radio frequency channel number, and a base station identity code;
detect that the first location identifier of the cell is same as a location identifier of the second network in any record in the blacklist; and
detect whether a location area identity of the cell is same as the location area identity that is allocated to the terminal by the first network before the terminal falls back to the second network,
wherein obtaining the total number of unsuccessful established voice services further comprises detecting that the location area identity of the cell is not the same as the location area identity that is allocated to the terminal by the first network before the terminal falls back to the second network, and wherein the total number of unsuccessful established voice service further comprises a sum of the quantity of voice service establishment failure times in each record in which the location identifier of the second network and the first location identifier of the cell is the same.

17. The terminal of claim 11, wherein the communications component is further configured to initiate or receive the voice service again, and wherein the processor is further configured to:
fall back from the first network to the second network based on the CSFB;
obtain a first location identifier of the cell, wherein the first location identifier of the cell is a location area identity, a combination of the location area identity and a cell identity, or a combination of the location area identity, an absolute radio frequency channel number, and a base station identity code;
detect that the first location identifier of the cell is same as the location identifier of the second network in any record in the blacklist;
detect whether a location area identity of the cell is same as a location area identity that is allocated to the terminal by the first network before the terminal falls back to the second network;
obtain a second location identifier of the first network when detecting that the location area identity of the cell is same as the location area identity that is allocated to the terminal by the first network before the terminal falls back to the second network, wherein the second location identifier of the first network is a tracking area identity or a location area identity;
detect whether the second location identifier of the first network is same as the first location identifier of the first network in this record that is the first location identifier of the cell is same as the location identifier of the second network;
and
delete all records in the blacklist after the terminal is powered off.

18. The terminal of claim 11, wherein the processor is further configured to:
set a valid time for the record in the blacklist and delete the record when the valid time expires; or
initiate or receive, using the communications component, the voice service again, fall back from the first network to the second network based on the CSFB, obtain a second location identifier of the first network and a first location identifier of the cell when the voice service is successfully established in the second network, detect that the second location identifier of the first network and the first location identifier of the cell match any record in the blacklist, and delete that matched record, wherein the first location identifier of the cell is a location area identity, a combination of the location area identity and a cell identity, or a combination of the location area identity, an absolute radio frequency channel number, and a base station identity code, and wherein the second location identifier of the first network is a tracking area identity or a location area identity.

19. The terminal of claim 18, wherein the processor is further configured to:
- identify that the second location identifier of the first network is the same as the location identifier of the first network in the record in the blacklist and the first location identifier of the cell is the same as the location identifier of the second network in the record; and
- determine that the second location identifier and the first location identifier match the record in the blacklist.

20. The terminal of claim 11, wherein the location identifier of the first network is a tracking area identity of the first network or a location area identity of the first network, and wherein the location identifier of the second network is a location area identity of the second network, a combination of the location area identity of the second network and a cell identity corresponding to the location area identity of the second network, or a combination of the location area identity of the second network, an absolute radio frequency channel number, and a base station identity code.

* * * * *

UNITED STATES PATENT AND TRADEMARK OFFICE
CERTIFICATE OF CORRECTION

PATENT NO. : 11,412,434 B2
APPLICATION NO. : 16/755695
DATED : August 9, 2022
INVENTOR(S) : Zhongjin Li et al.

Page 1 of 1

It is certified that error appears in the above-identified patent and that said Letters Patent is hereby corrected as shown below:

On the Title Page

(57) Abstract, Line 2: "service, and" should read "service, if"

(57) Abstract, Line 4: "fallback (CSFB)" should read "fallback CSFB"

(57) Abstract, Lines 5 and 6: "voice service when the" should read "voice service; and when the"

(57) Abstract, Line 9: "to a blacklist. The blacklist" should read "to a blacklist as one record, and the blacklist"

Signed and Sealed this
Fourth Day of October, 2022

Katherine Kelly Vidal
*Director of the United States Patent and Trademark Office*